United States Patent
Zhang et al.

(10) Patent No.: US 11,832,354 B2
(45) Date of Patent: Nov. 28, 2023

(54) INTEGRATED ACCESS AND BACKHAUL NODE SPECIFIC GUARD INTERVALS

(71) Applicant: QUALCOMM Incorporated, San Diego, CA (US)

(72) Inventors: Xiaoxia Zhang, San Diego, CA (US); Jun Ma, San Diego, CA (US); Morteza Soltani, San Diego, CA (US); Raviteja Patchava, San Diego, CA (US); Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/446,594

(22) Filed: Aug. 31, 2021

(65) Prior Publication Data

US 2023/0064285 A1    Mar. 2, 2023

(51) Int. Cl.
*H04W 88/14* (2009.01)
*H04L 5/00* (2006.01)
*H04L 27/26* (2006.01)

(52) U.S. Cl.
CPC ........... *H04W 88/14* (2013.01); *H04L 5/0051* (2013.01); *H04L 27/2607* (2013.01); *H04L 27/2636* (2013.01)

(58) Field of Classification Search
None
See application file for complete search history.

(56) References Cited

U.S. PATENT DOCUMENTS

2018/0367362 A1* 12/2018 Sun ................. H04L 27/2605
2021/0212059 A1   7/2021 Luo et al.
2021/0227544 A1   7/2021 Luo et al.
(Continued)

FOREIGN PATENT DOCUMENTS

WO   2020202190 A1   10/2020

OTHER PUBLICATIONS

CEWIT: "Discussions on Resource Multiplexing among Backhaul and Access Links", 3GPP TSG RAN WG1 Meeting #98bis, R1-1911237_RESOURCEALLOCATIONIAB, 3rd Generation Partnership Project, Mobile Competence Centre, 650, Route Des Lucioles, F-06921 Sophia-Antipolis Cedex, France, vol. RAN WG1, No. Chongqing, CN, Oct. 14, 2019-Oct. 20, 2019, Oct. 5, 2019, 10 Pages, XP051808884.
(Continued)

*Primary Examiner* — Hong Shao
(74) *Attorney, Agent, or Firm* — Harrity & Harrity, LLP/Qualcomm Incorporated

(57) ABSTRACT

Various aspects of the present disclosure generally relate to wireless communication. In some aspects, an integrated access and backhaul (IAB) node may receive, from a first wireless device, an uplink communication using a first guard interval. The IAB may receive, from a second wireless device, a downlink communication using a second guard interval, a second length of the second guard interval being different from a first length of the first guard interval. The IAB may process the uplink communication and the downlink communication in a same fast Fourier transform window. Numerous other aspects are described.

30 Claims, 19 Drawing Sheets

(56) References Cited

U.S. PATENT DOCUMENTS

2022/0124657 A1\* 4/2022 Baldemair ........ H04W 56/0015
2022/0174670 A1\* 6/2022 Liu ...................... H04L 5/0044

OTHER PUBLICATIONS

Partial International Search Report—PCT/US2022/074345—ISA/EPO—dated Nov. 10, 2022.
Huawei., et al., "Enhancements for Simultaneous Operation of MT and DU", 3GPP TSG RAN WGI Meeting #102-e, 3GPP Draft, R1-2005261, 3rd Generation Partnership Project (3GPP), Mobile Competence Centre, 650, Route Des Lucioles, F-06921 Sophia-Antipolis Cedex, France, vol. RAN WG1, No. E-meeting, Aug. 17, 2020-Aug. 28, 2020, Aug. 8, 2020 (Aug. 8, 2020), 11 Pages, XP051917309, Paragraph [02.3]—Paragraph [02.4].
International Search Report and Written Opinion—PCT/US2022/074345—ISA/EPO—dated Jan. 26, 2023.

\* cited by examiner

INTEGRATED ACCESS AND BACKHAUL NODE SPECIFIC GUARD INTERVALS

FIELD OF THE DISCLOSURE

Aspects of the present disclosure generally relate to wireless communication and to techniques and apparatuses for integrated access and backhaul node specific guard intervals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an integrated access and backhaul (IAB) node. The method may include receiving, from a first wireless device, an uplink communication using a first guard interval. The method may include receiving, from a second wireless device, a downlink communication using a second guard interval, a second length of the second guard interval being different from a first length of the first guard interval. The method may include processing the uplink communication and the downlink communication in a same fast Fourier transform (FFT) window.

Some aspects described herein relate to a method of wireless communication performed by an IAB donor. The method may include receiving, from an IAB node, data indicating a first length of a first guard interval for downlink communications with the IAB node. The method may include transmitting, to the IAB node, first configuration information indicating the first length of the first guard interval, the first length of the first guard interval being different from a second length of a second guard interval associated with uplink communications associated with the IAB node. The method may include transmitting, to the IAB node and using the first length of the first guard interval, a downlink communication.

Some aspects described herein relate to a method of wireless communication performed by an IAB parent node. The method may include receiving, from a first IAB node, a first uplink communication using a first guard interval. The method may include receiving, from a second IAB node, a second uplink communication using a second guard interval, a second length of the second guard interval being different from a first length of the first guard interval. The method may include processing the first uplink communication and the second uplink communication in a same FFT window.

Some aspects described herein relate to a method of wireless communication performed by an IAB node. The method may include receiving, from an IAB parent node and during an FFT window, a first downlink communication using a first guard interval. The method may include transmitting, to a wireless device and during the FFT window, a second downlink communication using a second guard interval, where the first guard interval and second guard interval provide symbol-level alignment for the first downlink communication and the second downlink communication.

Some aspects described herein relate to a method of wireless communication performed by an IAB node. The method may include receiving, from an IAB child node and during a Fourier transform window, a first uplink communication using a first guard interval. The method may include transmitting, to an IAB parent node and during the Fourier transform window, a second uplink communication using a second guard interval, where the first guard interval and second guard interval provide symbol-level alignment for the first uplink communication and the second uplink communication.

Some aspects described herein relate to an IAB node for wireless communication. The IAB node may include a memory and one or more processors coupled to the memory. The one or more processors may be configured to receive, from a first wireless device, an uplink communication using a first guard interval. The one or more processors may be configured to receive, from a second wireless device, a downlink communication using a second guard interval. The one or more processors may be configured to process the uplink communication and the downlink communication in a same FFT window.

Some aspects described herein relate to an IAB donor for wireless communication. The IAB donor may include a memory and one or more processors coupled to the memory. The one or more processors may be configured to receive, from an IAB node, data indicating a first length of a first guard interval for downlink communications with the IAB node. The one or more processors may be configured to transmit, to the IAB node, first configuration information indicating the first length of the first guard interval. The one or more processors may be configured to transmit, to the IAB node and using the first length of the first guard interval, a downlink communication.

Some aspects described herein relate to an IAB parent node for wireless communication. The IAB parent node may include a memory and one or more processors coupled to the memory. The one or more processors may be configured to receive, from a first IAB node, a first uplink communication using a first guard interval. The one or more processors may be configured to receive, from a second IAB node, a second uplink communication using a second guard interval. The one or more processors may be configured to process the first uplink communication and the second uplink communication in a same FFT window.

Some aspects described herein relate to an IAB node for wireless communication. The IAB node may include a memory and one or more processors coupled to the memory. The one or more processors may be configured to receive, from an IAB parent node and during an FFT window, a first downlink communication using a first guard interval. The one or more processors may be configured to transmit, to a wireless device and during the FFT window, a second downlink communication using a second guard interval.

Some aspects described herein relate to an IAB node for wireless communication. The IAB node may include a memory and one or more processors coupled to the memory. The one or more processors may be configured to receive, from an IAB child node and during a Fourier transform window, a first uplink communication using a first guard interval. The one or more processors may be configured to transmit, to an IAB parent node and during the Fourier transform window, a second uplink communication using a second guard interval.

Some aspects described herein relate to a non-transitory computer-readable medium that stores a set of instructions for wireless communication by a one or more instructions that, when executed by one or more processors of an IAB node. The set of instructions, when executed by one or more processors of the one or more instructions that, when executed by one or more processors of an IAB node, may cause the one or more instructions that, when executed by one or more processors of an IAB node to receive, from a first wireless device, an uplink communication using a first guard interval. The set of instructions, when executed by one or more processors of the one or more instructions that, when executed by one or more processors of an IAB node, may cause the one or more instructions that, when executed by one or more processors of an IAB node to receive, from a second wireless device, a downlink communication using a second guard interval. The set of instructions, when executed by one or more processors of the one or more instructions that, when executed by one or more processors of an IAB node, may cause the one or more instructions that, when executed by one or more processors of an IAB node to process the uplink communication and the downlink communication in a same FFT window.

Some aspects described herein relate to a non-transitory computer-readable medium that stores a set of instructions for wireless communication by a one or more instructions that, when executed by one or more processors of an IAB donor. The set of instructions, when executed by one or more processors of the one or more instructions that, when executed by one or more processors of an IAB donor, may cause the one or more instructions that, when executed by one or more processors of an IAB donor to receive, from an IAB node, data indicating a first length of a first guard interval for downlink communications with the IAB node. The set of instructions, when executed by one or more processors of the one or more instructions that, when executed by one or more processors of an IAB donor, may cause the one or more instructions that, when executed by one or more processors of an IAB donor to transmit, to the IAB node, first configuration information indicating the first length of the first guard interval. The set of instructions, when executed by one or more processors of the one or more instructions that, when executed by one or more processors of an IAB donor, may cause the one or more instructions that, when executed by one or more processors of an IAB donor to transmit, to the IAB node and using the first length of the first guard interval, a downlink communication.

Some aspects described herein relate to a non-transitory computer-readable medium that stores a set of instructions for wireless communication by a one or more instructions that, when executed by one or more processors of an IAB parent node. The set of instructions, when executed by one or more processors of the one or more instructions that, when executed by one or more processors of an IAB parent node, may cause the one or more instructions that, when executed by one or more processors of an IAB parent node to receive, from a first IAB node, a first uplink communication using a first guard interval. The set of instructions, when executed by one or more processors of the one or more instructions that, when executed by one or more processors of an IAB parent node, may cause the one or more instructions that, when executed by one or more processors of an IAB parent node to receive, from a second IAB node, a second uplink communication using a second guard interval. The set of instructions, when executed by one or more processors of the one or more instructions that, when executed by one or more processors of an IAB parent node, may cause the one or more instructions that, when executed by one or more processors of an IAB parent node to process the first uplink communication and the second uplink communication in a same FFT window.

Some aspects described herein relate to a non-transitory computer-readable medium that stores a set of instructions for wireless communication by a one or more instructions that, when executed by one or more processors of an IAB node. The set of instructions, when executed by one or more processors of the one or more instructions that, when executed by one or more processors of an IAB node, may cause the one or more instructions that, when executed by one or more processors of an IAB node to receive, from an IAB parent node and during an FFT window, a first downlink communication using a first guard interval. The set of instructions, when executed by one or more processors of the one or more instructions that, when executed by one or more processors of an IAB node, may cause the one or more instructions that, when executed by one or more processors of an IAB node to transmit, to a wireless device and during the FFT window, a second downlink communication using a second guard interval.

Some aspects described herein relate to a non-transitory computer-readable medium that stores a set of instructions for wireless communication by a one or more instructions that, when executed by one or more processors of an IAB node. The set of instructions, when executed by one or more processors of the one or more instructions that, when executed by one or more processors of an IAB node, may cause the one or more instructions that, when executed by one or more processors of an IAB node to receive, from an IAB child node and during a Fourier transform window, a first uplink communication using a first guard interval. The set of instructions, when executed by one or more processors of the one or more instructions that, when executed by one or more processors of an IAB node, may cause the one or more instructions that, when executed by one or more processors of an IAB node to transmit, to an IAB parent node and during the Fourier transform window, a second uplink communication using a second guard interval.

Some aspects described herein relate to an apparatus for wireless communication. The apparatus may include means for receiving, from a first wireless device, an uplink communication using a first guard interval. The apparatus may include means for receiving, from a second wireless device, a downlink communication using a second guard interval, a second length of the second guard interval being different from a first length of the first guard interval. The apparatus may include means for processing the uplink communication and the downlink communication in a same FFT window.

Some aspects described herein relate to an apparatus for wireless communication. The apparatus may include means for receiving, from an IAB node, data indicating a first length of a first guard interval for downlink communications with the IAB node. The apparatus may include means for transmitting, to the IAB node, first configuration information indicating the first length of the first guard interval, the first length of the first guard interval being different from a second length of a second guard interval associated with uplink communications associated with the IAB node. The apparatus may include means for transmitting, to the IAB node and using the first length of the first guard interval, a downlink communication.

Some aspects described herein relate to an apparatus for wireless communication. The apparatus may include means for receiving, from a first IAB node, a first uplink communication using a first guard interval. The apparatus may include means for receiving, from a second IAB node, a second uplink communication using a second guard interval, a second length of the second guard interval being different from a first length of the first guard interval. The apparatus may include means for processing the first uplink communication and the second uplink communication in a same FFT window.

Some aspects described herein relate to an apparatus for wireless communication. The apparatus may include means for receiving, from an IAB parent node and during an FFT window, a first downlink communication using a first guard interval. The apparatus may include means for transmitting, to a wireless device and during the FFT window, a second downlink communication using a second guard interval, where the first guard interval and second guard interval provide symbol-level alignment for the first downlink communication and the second downlink communication.

Some aspects described herein relate to an apparatus for wireless communication. The apparatus may include means for receiving, from an IAB child node and during a Fourier transform window, a first uplink communication using a first guard interval. The apparatus may include means for transmitting, to an IAB parent node and during the Fourier transform window, a second uplink communication using a second guard interval, where the first guard interval and second guard interval provide symbol-level alignment for the first uplink communication and the second uplink communication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
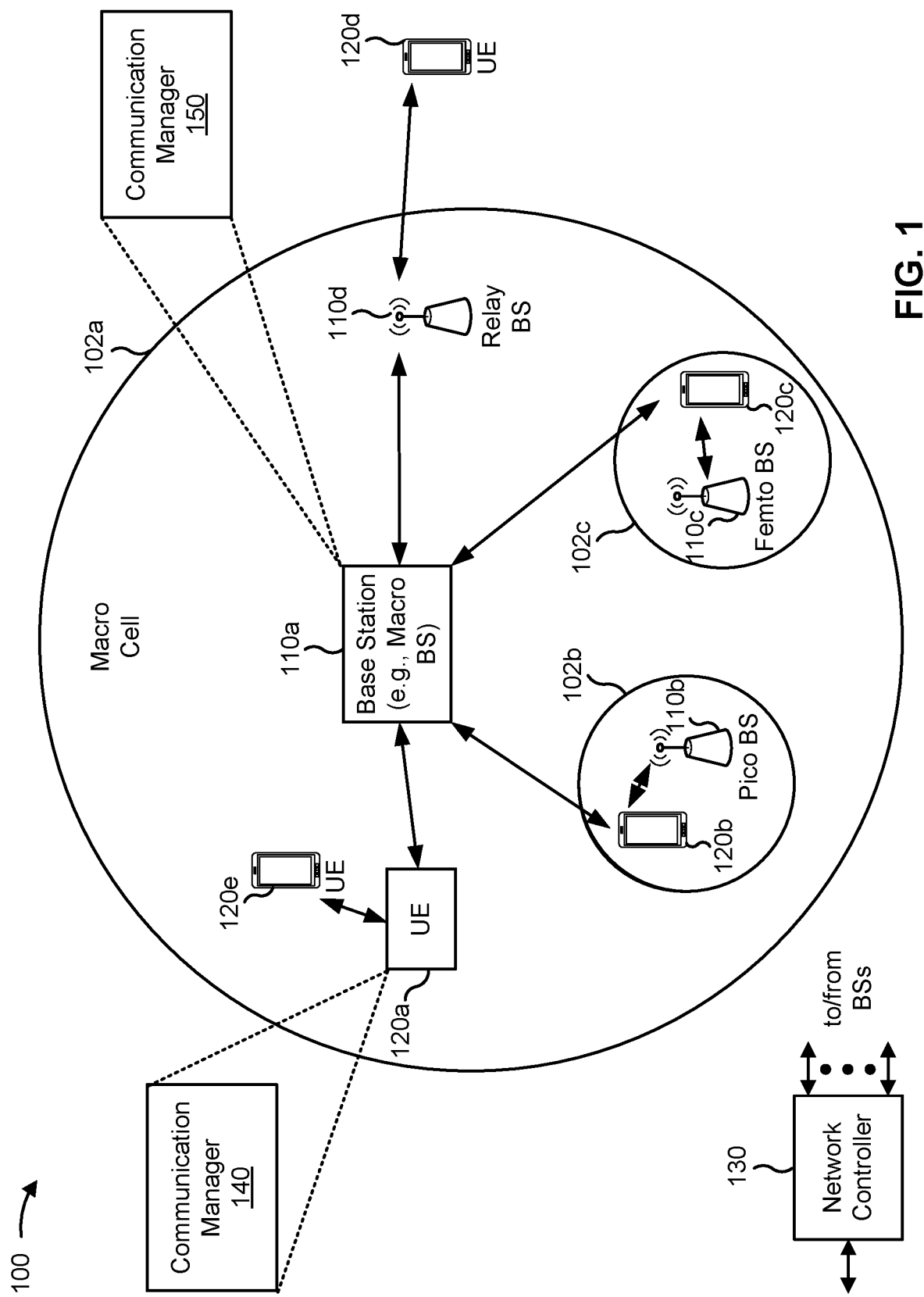
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station, or integrated access and backhaul (IAB) node) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the base station 110 (e.g., IAB node) may include a communication manager 150. As described in more detail elsewhere herein, the communication manager 150 may receive, from a first wireless device, an uplink communication using a first guard interval; receive, from a second wireless device, a downlink communication using a second guard interval, a second length of the second guard interval being different from a first length of the first guard interval; and process the uplink communication and the downlink communication in a same FFT window.

In some aspects, the communication manager 150 may receive, from an IAB node, data indicating a first length of a first guard interval for downlink communications with the IAB node; transmit, to the IAB node, first configuration information indicating the first length of the first guard interval, the first length of the first guard interval being different from a second length of a second guard interval associated with uplink communications associated with the IAB node; and transmit, to the IAB node and using the first length of the first guard interval, a downlink communication.

In some aspects, the communication manager 150 may receive, from a first IAB node, a first uplink communication using a first guard interval; receive, from a second IAB node, a second uplink communication using a second guard interval, a second length of the second guard interval being different from a first length of the first guard interval; and process the first uplink communication and the second uplink communication in a same FFT window. Additionally, or alternatively, the communication manager 150 may perform one or more other operations described herein.

In some aspects, the communication manager 150 may receive, from an IAB parent node and during an FFT window, a first downlink communication using a first guard interval; and transmit, to a wireless device and during the FFT window, a second downlink communication using a second guard interval, wherein the first guard interval and second guard interval provide symbol-level alignment for the first downlink communication and the second downlink communication. Additionally, or alternatively, the communication manager 150 may perform one or more other operations described herein.

In some aspects, the communication manager 150 may receive, from an IAB child node and during a Fourier transform window, a first uplink communication using a first guard interval; and transmit, to an IAB parent node and during the Fourier transform window, a second uplink communication using a second guard interval, wherein the first guard interval and second guard interval provide symbol-level alignment for the first uplink communication and the second uplink communication. Additionally, or alternatively, the communication manager 150 may perform one or more other operations described herein.

As indicated above, FIG. 1 is provided as an example. Other examples may differ from what is described with regard to FIG. 1.

Figure 2:
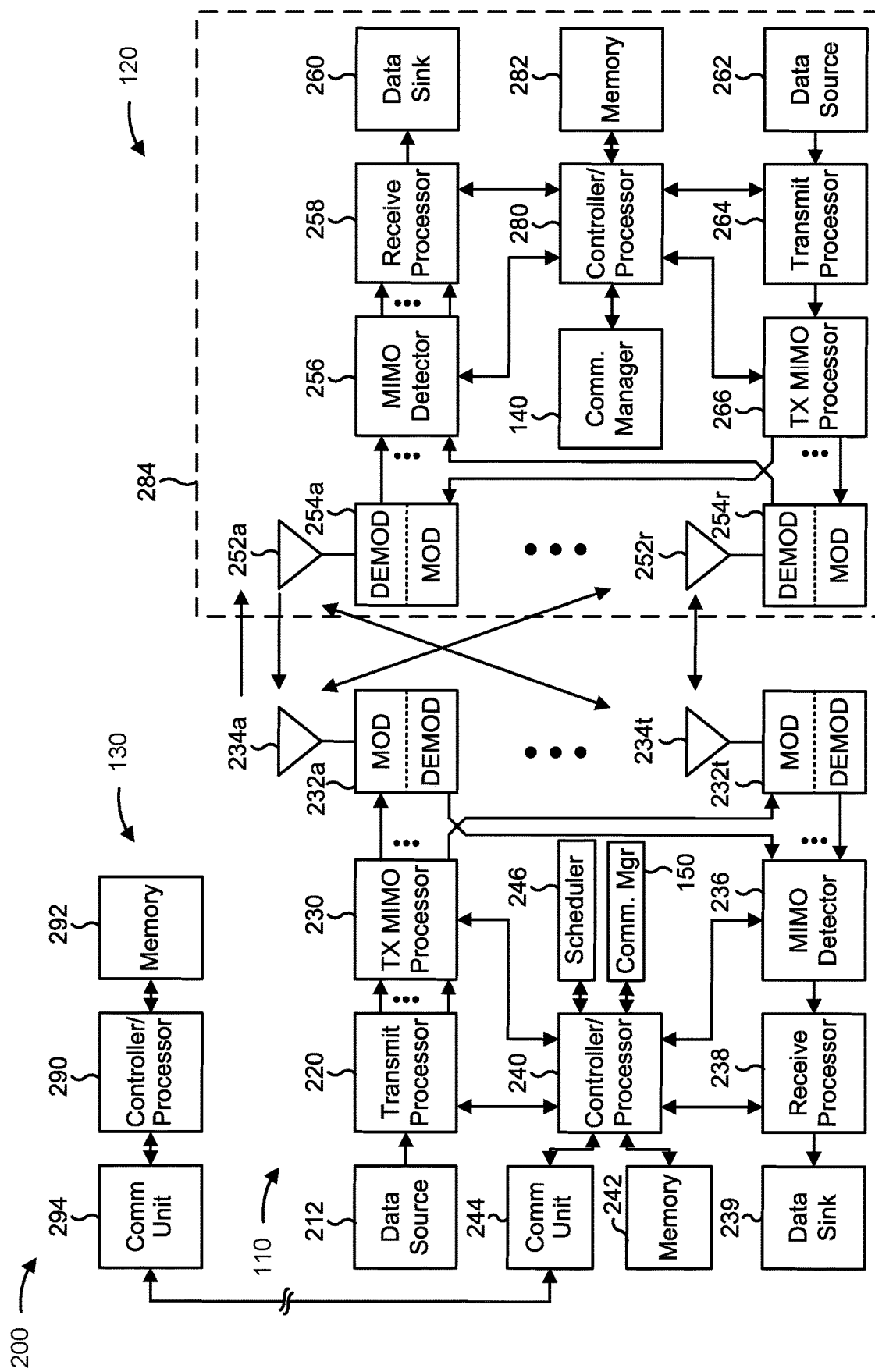
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 10-19).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 10-19).

The controller/processor 240 of the base station 110, the controller/processor 280 of the UE 120, and/or any other component(s) of FIG. 2 may perform one or more techniques associated with IAB node specific guard intervals, as described in more detail elsewhere herein. For example, the controller/processor 240 of the base station 110, the controller/processor 280 of the UE 120, and/or any other component(s) of FIG. 2 may perform or direct operations of, for example, process 1400 of FIG. 14, process 1500 of FIG. 15, process 1600 of FIG. 16, process 1700 of FIG. 17, process 1800 of FIG. 18, and/or other processes as described herein. In some aspects, the IAB node described herein is the base station 110, is included in the base station 110, or includes one or more components of the base station 110 shown in FIG. 2. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1400 of FIG. 14, process 1500 of FIG. 15, process 1600 of FIG. 16, process 1700 of FIG. 17, process 1800 of FIG. 18, and/or other processes as described herein. In some examples, executing instructions may include running the instructions, converting the instructions, compiling the instructions, and/or interpreting the instructions, among other examples.

In some aspects, the base station (e.g., IAB node) includes means for receiving (e.g., using antenna 234, modem 232, MIMO detector 236, receive processor 238, controller/processor 240, memory 242, or the like), from a first wireless device, an uplink communication using a first guard interval; means for receiving (e.g., using antenna 234, modem 232, MIMO detector 236, receive processor 238, controller/processor 240, memory 242, or the like), from a second wireless device, a downlink communication using a second guard interval, a second length of the second guard interval being different from a first length of the first guard interval; and/or means for processing (e.g., using controller/processor 240, memory 242, or the like) the uplink communication and the downlink communication in a same FFT window. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the base station (e.g., IAB node) includes means for receiving (e.g., using antenna 234, modem 232, MIMO detector 236, receive processor 238, controller/processor 240, memory 242, or the like), from an IAB node, data indicating a first length of a first guard interval for downlink communications with the IAB node; means for transmitting (e.g., using controller/processor 240, transmit processor 220, TX MIMO processor 230, modem 232, antenna 234, memory 242, or the like), to the IAB node, first configuration information indicating the first length of the first guard interval, the first length of the first guard interval being different from a second length of a second guard interval associated with uplink communications associated with the IAB node; and/or means for transmitting (e.g., using controller/processor 240, transmit processor 220, TX MIMO processor 230, modem 232, antenna 234, memory 242, or the like), to the IAB node and using the first length of the first guard interval, a downlink communication. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the base station (e.g., IAB node) includes means for receiving (e.g., using antenna 234, modem 232, MIMO detector 236, receive processor 238, controller/processor 240, memory 242, or the like), from a first IAB node, a first uplink communication using a first guard interval; means for receiving (e.g., using antenna 234, modem 232, MIMO detector 236, receive processor 238, controller/processor 240, memory 242, or the like), from a second IAB node, a second uplink communication using a second guard interval, a second length of the second guard interval being different from a first length of the first guard interval; and/or means for processing (e.g., using controller/processor 240, memory 242, or the like) the first uplink communication and the second uplink communication in a same FFT window. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the base station (e.g., IAB node) includes means for receiving (e.g., using antenna 234, modem 232, MIMO detector 236, receive processor 238, controller/processor 240, memory 242, or the like), from an IAB parent node and during an FFT window, a first downlink communication using a first guard interval; and/or means for transmitting (e.g., using controller/processor 240, transmit processor 220, TX MIMO processor 230, modem 232, antenna 234, memory 242, or the like), to a wireless device and during the FFT window, a second downlink communication using a second guard interval, wherein the first guard interval and second guard interval provide symbol-level alignment for the first downlink communication and the second downlink communication. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the base station (e.g., IAB node) includes means for receiving (e.g., using antenna 234, modem 232, MIMO detector 236, receive processor 238, controller/processor 240, memory 242, or the like), from an IAB child node and during a Fourier transform window, a first uplink communication using a first guard interval; and/or means for transmitting (e.g., using controller/processor 240, transmit processor 220, TX MIMO processor 230, modem 232, antenna 234, memory 242, or the like), to an IAB parent node and during the Fourier transform window, a second uplink communication using a second guard interval, wherein the first guard interval and second guard interval provide symbol-level alignment for the first uplink communication and the second uplink communication. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
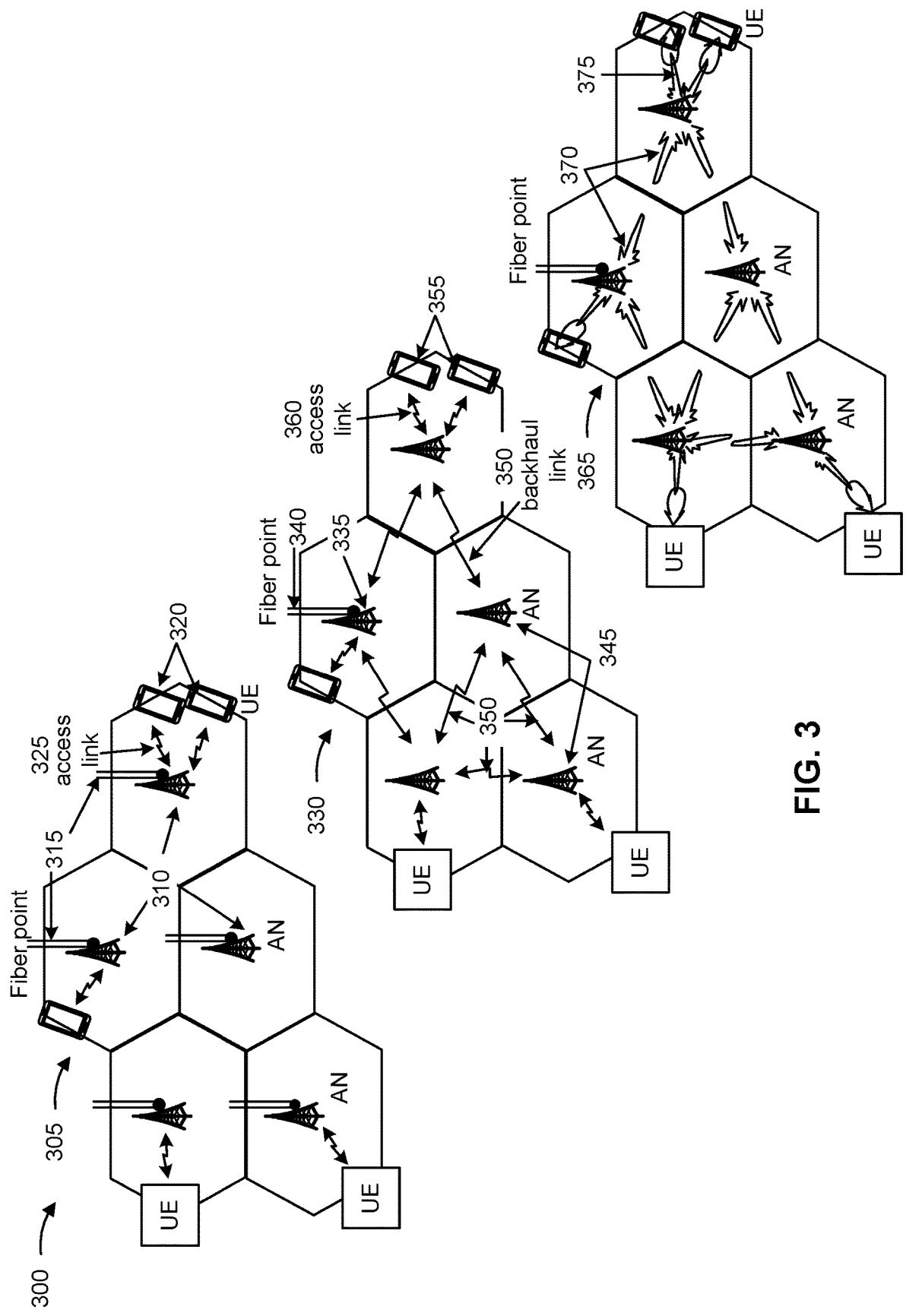
FIG. 3 is a diagram illustrating examples of radio access networks, in accordance with the present disclosure.

FIG. 3 is a diagram illustrating examples 300 of radio access networks, in accordance with the present disclosure.

As shown by reference number 305, a traditional (e.g., 3G, 4G, or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an IAB network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
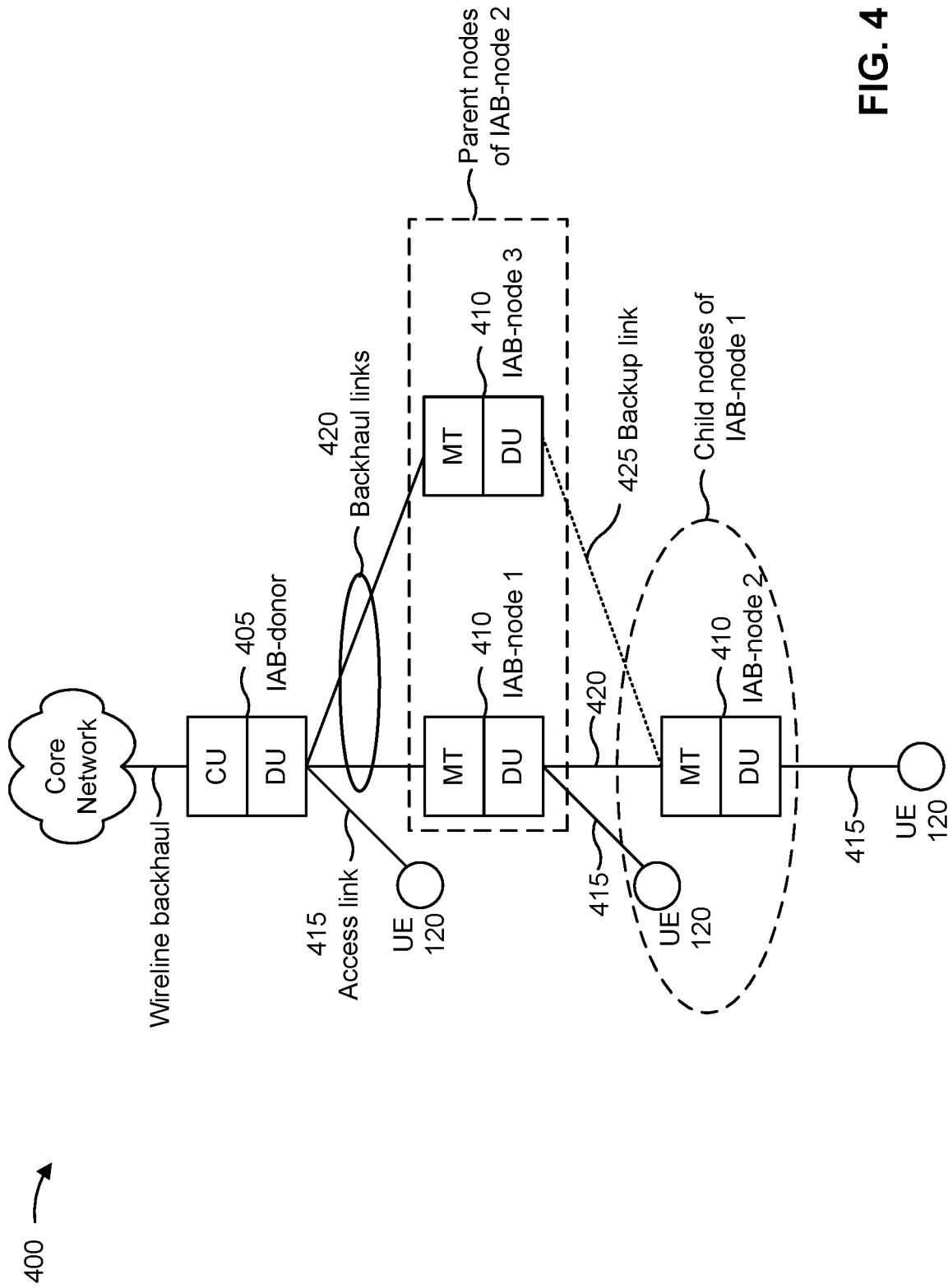
FIG. 4 is a diagram illustrating an example of an integrated access and backhaul (IAB) network architecture, in accordance with the present disclosure.

FIG. 4 is a diagram illustrating an example 400 of an IAB network architecture, in accordance with the present disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function. In some aspects, an IAB donor 405 may include a base station 110, such as an anchor base station, as described above in connection with 3. As shown, an IAB donor 405 may include a central unit (CU), which may perform access node controller (ANC) functions and/or access and mobility management function (AMF) functions. The CU may configure a distributed unit (DU) of the IAB donor 405 and/or may configure one or more IAB nodes 410 (e.g., a mobile termination (MT) and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message or an F1 application protocol (F1-AP) message).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include MT functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB-node 2 and IAB-node 3 may be used for backhaul communications if a primary backhaul link between IAB-node 2 and IAB-node 1 fails. As used herein, a node or a wireless node may refer to an IAB donor 405 or an IAB node 410.

As indicated above, FIG. 4 is provided as an example. Other examples may differ from what is described with regard to FIG. 4.

Figure 5:
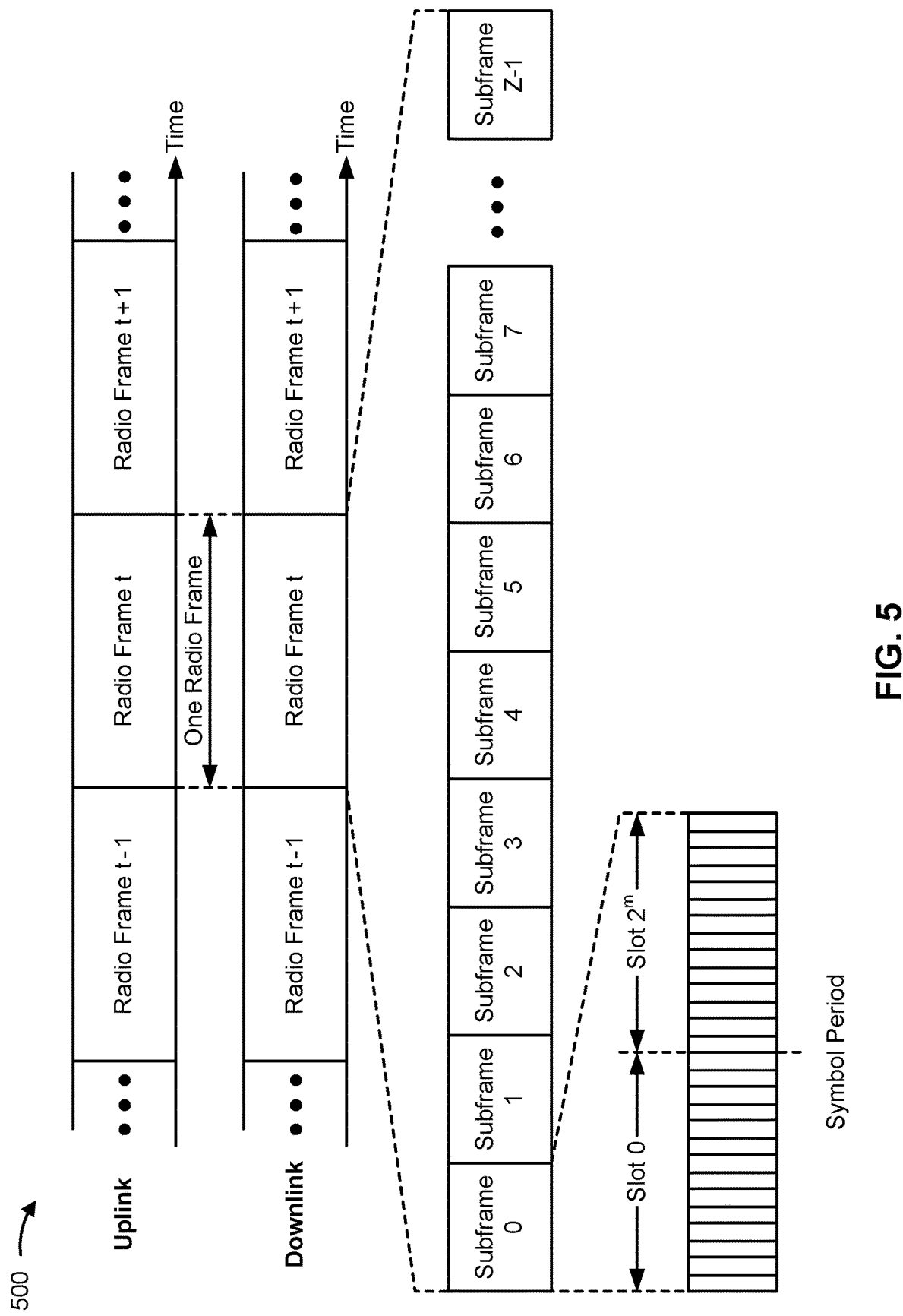
FIG. 5 is a diagram illustrating an example of a frame structure in a wireless communication network, in accordance with the present disclosure.

FIG. 5 is a diagram illustrating an example 500 of a frame structure in a wireless communication network, in accordance with the present disclosure. The frame structure shown in FIG. 5 is for frequency division duplexing (FDD) in a telecommunication system, such as LTE or NR. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2m slots per subframe are shown in FIG. 5, where m is an index of a numerology used for a transmission, such as 0, 1, 2, 3, 4, or another number). Each slot may include a set of L symbol periods. For example, each slot may include fourteen symbol periods (e.g., as shown in FIG. 5), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, mini-slot based, or symbol-based.

As indicated above, FIG. 5 is provided as an example. Other examples may differ from what is described with respect to FIG. 5.

Figure 6:
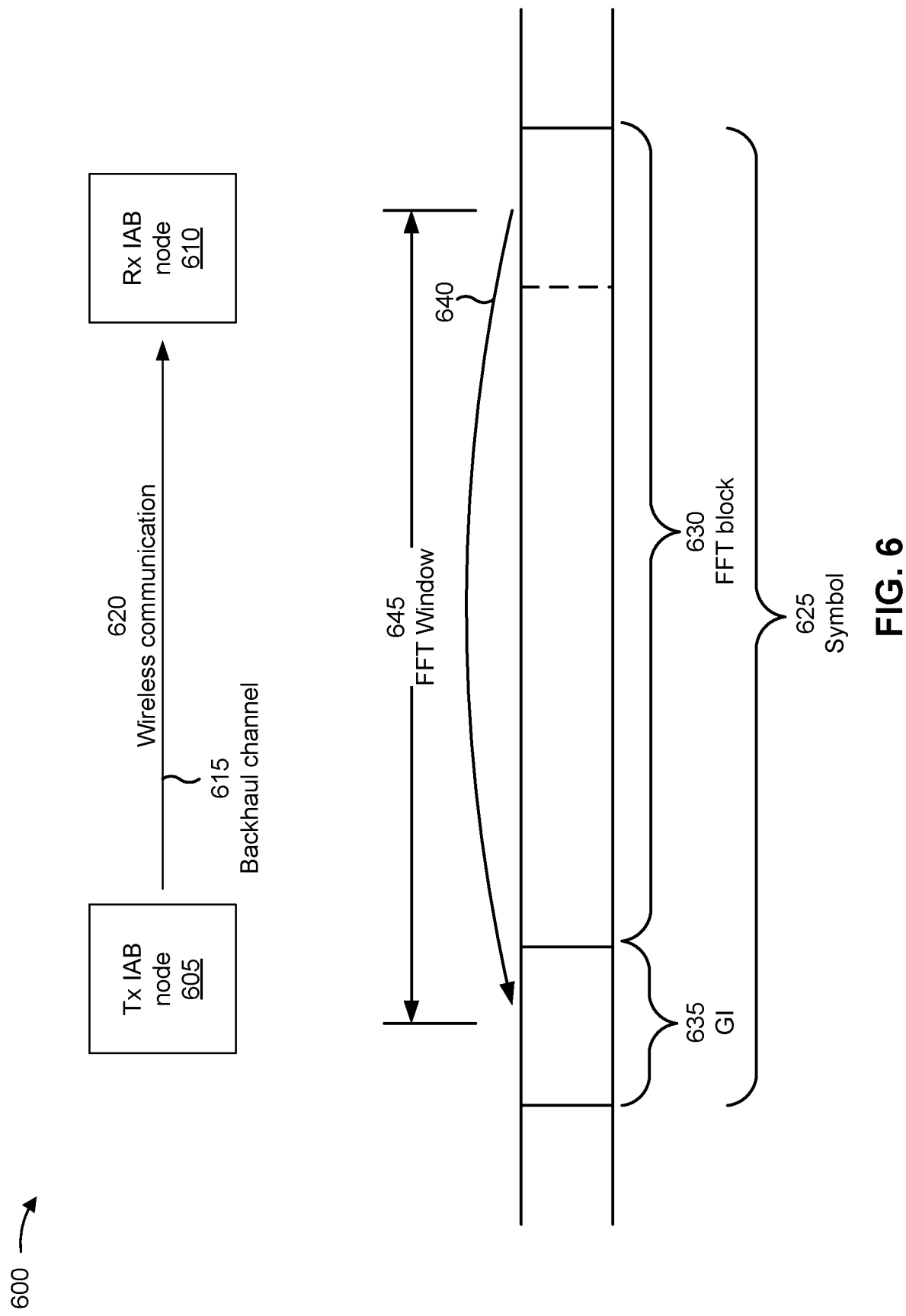
FIG. 6 is a diagram illustrating an example of a wireless communication symbol structure, in accordance with the present disclosure.

FIG. 6 is a diagram illustrating an example 600 of a wireless communication symbol structure, in accordance with the present disclosure. As shown in FIG. 6, a transmitter (Tx) IAB node 605 and a receiver (Rx) IAB node 610 may communicate using a backhaul channel 615 (e.g., in a similar manner to that described above). For example, as shown by reference number 620, the Tx IAB node 605 may transmit a communication or signal to the Rx IAB node 610 using the backhaul channel 615. While example 600 depicts communications using a backhaul channel 615, the wireless communication symbol structure may also be used for other wireless communication channels (e.g., access channels between IAB nodes and UEs).

As shown by reference number 625, an example symbol associated with the communication is depicted. As shown by reference number 630, the symbol may include an FFT block. The FFT block may include data (e.g., data samples) associated with the communication or signal. The FFT block may also be referred to as a data block. As shown by reference number 635, the symbol may include a guard interval (GI). As shown by reference number 640, the GI may be a copy of a portion of the FFT block of the symbol (e.g., shown by the dashed line in FIG. 6). For example, the GI of the symbol may be obtained by prepending a copy of the last N data samples from the end of the FFT block to the beginning of the FFT block. In this way, the symbol structure may result in a circular signal structure, such that the first N data samples and last N data samples of the symbol are identical. A GI may be used for a communication to avoid inter-symbol interference (ISI) between adjacent symbols in multipath channel environments. A transmitting device (e.g., the Tx IAB node 605) may transmit a symbol that may arrive at a receiving device (e.g., the Rx IAB node 610) with multiple replicas through different channel paths that have different propagation delays, and vice versa. If a duration of the GI is sufficiently large, there may be a window that contains a complete symbol from each replica so that ISI does not emerge within this window at the receiving device.

In some cases, a cyclic prefix (CP) may be used as an alternative to a GI to achieve the circular signal structure, maintain symbol and/or slot alignment, and enable one tap frequency domain equalization (FDE) at the receiving device. A CP may include random data, may begin outside of a corresponding symbol (and be reproduced at the end of the symbol), and may be fully contained within a slot, whereas the first GI of a slot may precede the slot.

As shown by reference number 645, an FFT window may be used by the Rx IAB node 610 to obtain data samples for performing frequency domain processing (e.g., for performing an FFT operation, for performing demodulation, and/or for performing decoding) of the signal. For example, the Rx IAB node 610 may use the data samples within the FFT window for frequency domain processing of the signal. A timing of the FFT window may be determined to minimize ISI due to interfering signals arriving at the beginning of the symbol (e.g., during the GI) and/or due to interfering signals arriving at the end of the symbol (e.g., associated with a subsequent symbol). As the data included in the GI may be identical to the data at the end of the FFT block, the Rx IAB node 610 may obtain all of the data included in the FFT block using the FFT window (e.g., that includes data from the GI and data from the FFT block). For example, the data obtained during the FFT window may be cyclic shifted from the data included in the FFT block of the symbol. As a result, the Rx IAB node 610 may obtain all of the data samples of the symbol while also minimizing ISI by using the FFT window as shown.

The transmitter and receiver may communicate to coordinate the timing of the FFT window at the receiver, as the channel conditions and timing offset between the transmitter and receiver can be determined to optimize the timing of the FFT window. For example, uplink transmissions to an IAB node may be configured to use a timing advance (TA) designed to account for a delay between transmission of an uplink communication and receipt of the uplink communication by the IAB node. The TA may be used, for example, to better align the uplink communications received by, and/or the downlink communications transmitted by, the IAB node (e.g., to reduce inter-symbol interference that may result from the uplink frames and/or downlink frames not aligning in the time domain at the base station). Similarly, the TA may be used for downlink communications to better align downlink communications.

For example, a parent node may transmit a TA command indicating an $N_{TA}$ value via downlink communication. The TA command may be transmitted as part of a random access channel (RACH) procedure (e.g., in a random access response (RAR) message of a RACH procedure). In some aspects, the TA command may be indicated in a medium access control control element (MAC-CE) message. The $N_{TA}$ value may account for propagation delay and may be based at least in part on an amount of time an uplink transmission from a child node takes to reach the parent node (e.g., may be based at least in part on a distance between the child node and the parent node).

The child node may determine the amount of time before the start of a downlink frame at which a corresponding uplink frame is to start based at least in part on the TA. For example, the child node may determine the amount of time according to the formula: $T_{TA}=(N_{TA}+N_{(TA\ offset)})T_c$, where $T_{TA}$ is the total TA, $N_{TA}$ accounts for propagation delay, $N_{(TA\ offset)}$ is a TA offset value, and $T_c$ is a timing constant, which may be defined by the 3GPP Specifications. $T_c$ may be based at least in part on a maximum subcarrier spacing and FFT size of the wireless network. In some cases, $T_c$ may have a value of 0.509 nanoseconds, among other examples. The TA offset value ($N_{(TA\ offset)}$) may be based at least in part on a frequency band or topology (e.g., FDD or time division duplexing (TDD)) that is being used for communications between the child node and the parent node. The TA offset value may be defined, or otherwise fixed, by the 3GPP Specifications. In some examples, the TA offset may be 13 μs for FR1 and 7 μs for FR2.

In some aspects, the TA offset value may account for an amount of time the receiver takes to switch between receiving communications and transmitting communications. By starting the uplink frame an amount of time before the corresponding downlink frame, the receiver and transmitter may synchronize symbols, thereby reducing inter-symbol interference that may result from the uplink frames and downlink frames (or sidelink frames) not aligning in the time domain at the receiver.

In some cases, the TA offset value may be a static value. For example, the child node may be provided with a TA offset value by the parent node or may determine a default TA offset value based at least in part on a frequency range or duplexing mode (FDD or TDD) that is used for communications between the child node and the parent node. For example, for FR1, the TA offset value (e.g., 13 μs) may be a semi-static value (e.g., the base station may configure a TA offset value based at least in part on communication types or a duplexing mode (FDD or TDD) that is used for communications between the child node and the parent node). However, for FR2, or other millimeter wave operating bands (e.g., FR3, FR4, or FR5), the TA offset value (e.g., 7 μs for FR2) may be a fixed value (e.g., not configurable). While the foregoing example describes TA for communications between a child node and parent node, the TA may also be used for other communication links (e.g., between a UE and an IAB node).

As indicated above, FIG. 6 is provided as an example. Other examples may differ from what is described with respect to FIG. 6.

Figure 7:
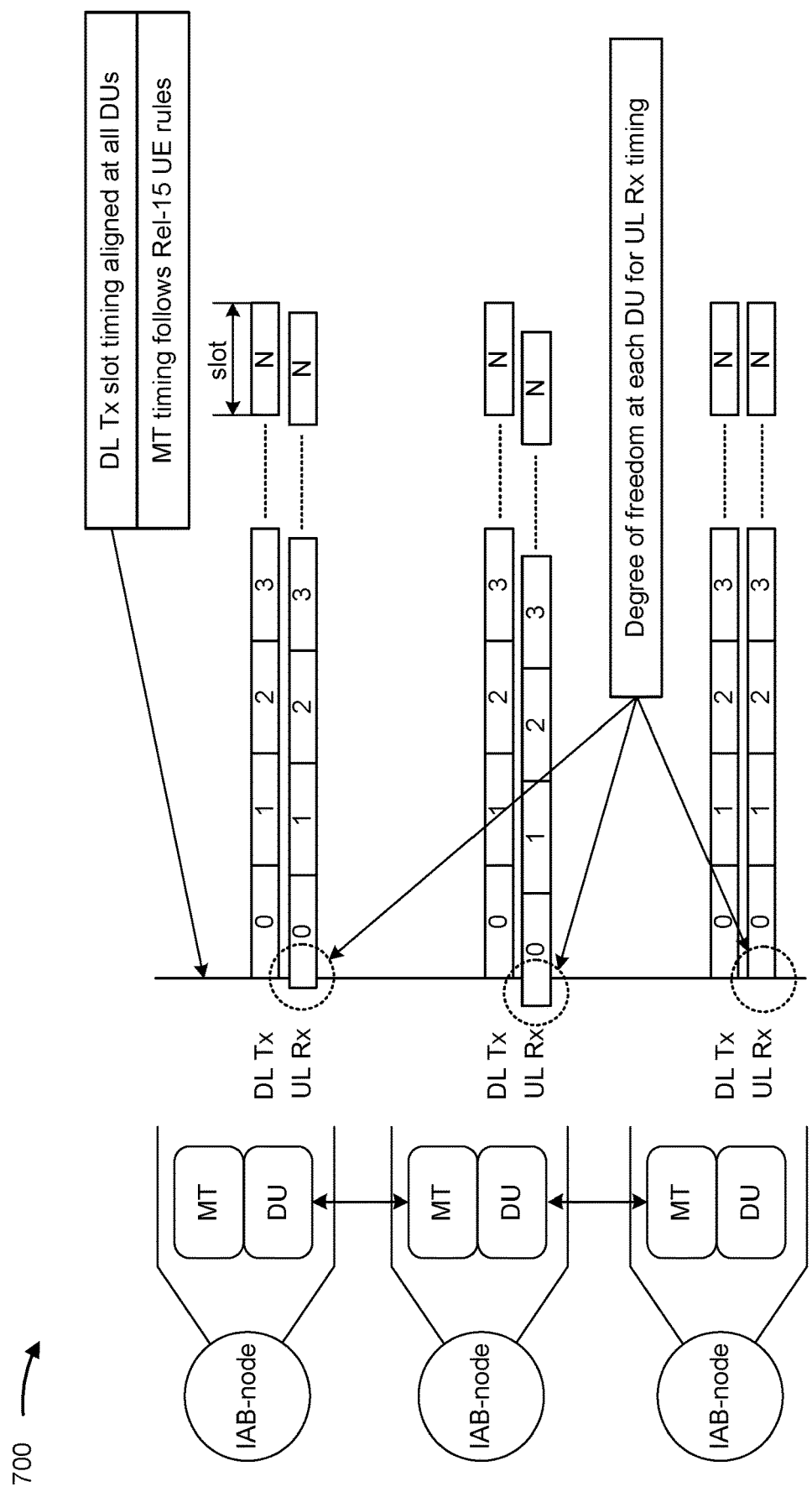
FIG. 7 is a diagram illustrating an example of node synchronization and timing alignment for IAB nodes, in accordance with the present disclosure.

FIG. 7 is a diagram illustrating an example 700 of node synchronization and timing alignment for IAB nodes, in accordance with the present disclosure. As shown in FIG. 7, the downlink transmission timing for all IAB nodes may be aligned with the parent IAB node or with donor downlink timing. The uplink transmission timing for an IAB node may be determined by calculating TA, e.g., as described herein, adding an offset from the parent node.

As shown by example 700, the DU of each IAB node may transmit downlink communications at the same time in alignment with one another. The MT of each child node transmits uplink communications to the DU of the child node's parent node, while the last child node may receive uplink communications from another device, such as a UE. The receipt of uplink communications at the DU of each IAB node is not necessarily aligned with the receipt of downlink communications at the MT of each IAB node, as downlink communications from parent nodes experience a propagation delay as they are transmitted, and the TA for uplink communications may cause the uplink communications to arrive early as compensation for the round trip time (RTT) of the uplink communications.

As indicated above, FIG. 7 is provided as an example. Other examples may differ from what is described with respect to FIG. 7.

Figure 8:
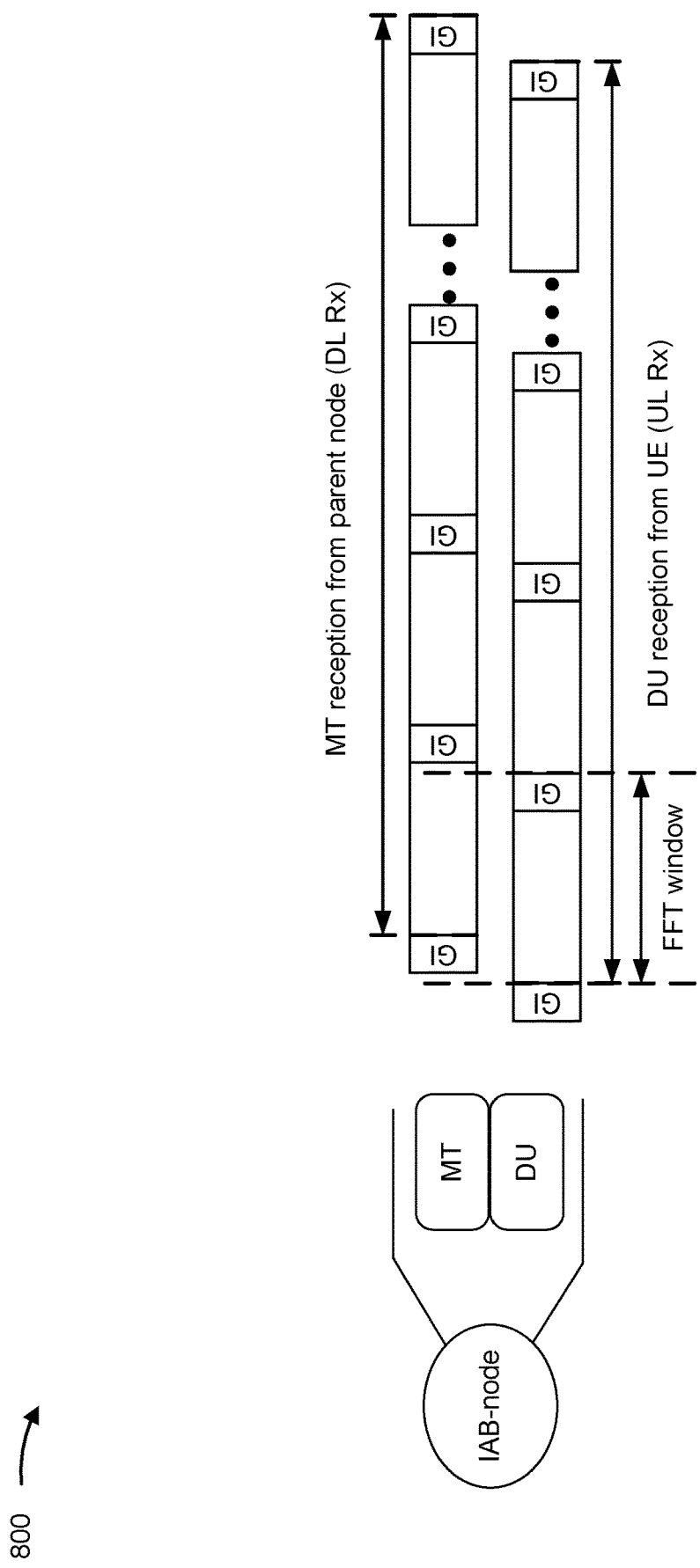
FIG. 8 is a diagram illustrating an example of IAB node reception of aligned uplink and downlink communications, in accordance with the present disclosure.

FIG. 8 is a diagram illustrating an example 800 of IAB node reception of aligned uplink and downlink communications, in accordance with the present disclosure. As shown in FIG. 8, an IAB node may receive an uplink communication at the DU before receiving a downlink communication at the MT. This may cause an FFT block to fall outside of the FFT window for the downlink or uplink communication, which may require an additional FFT process and/or may cause interference.

As indicated above, FIG. 8 is provided as an example. Other examples may differ from what is described with respect to FIG. 8.

Figure 9:
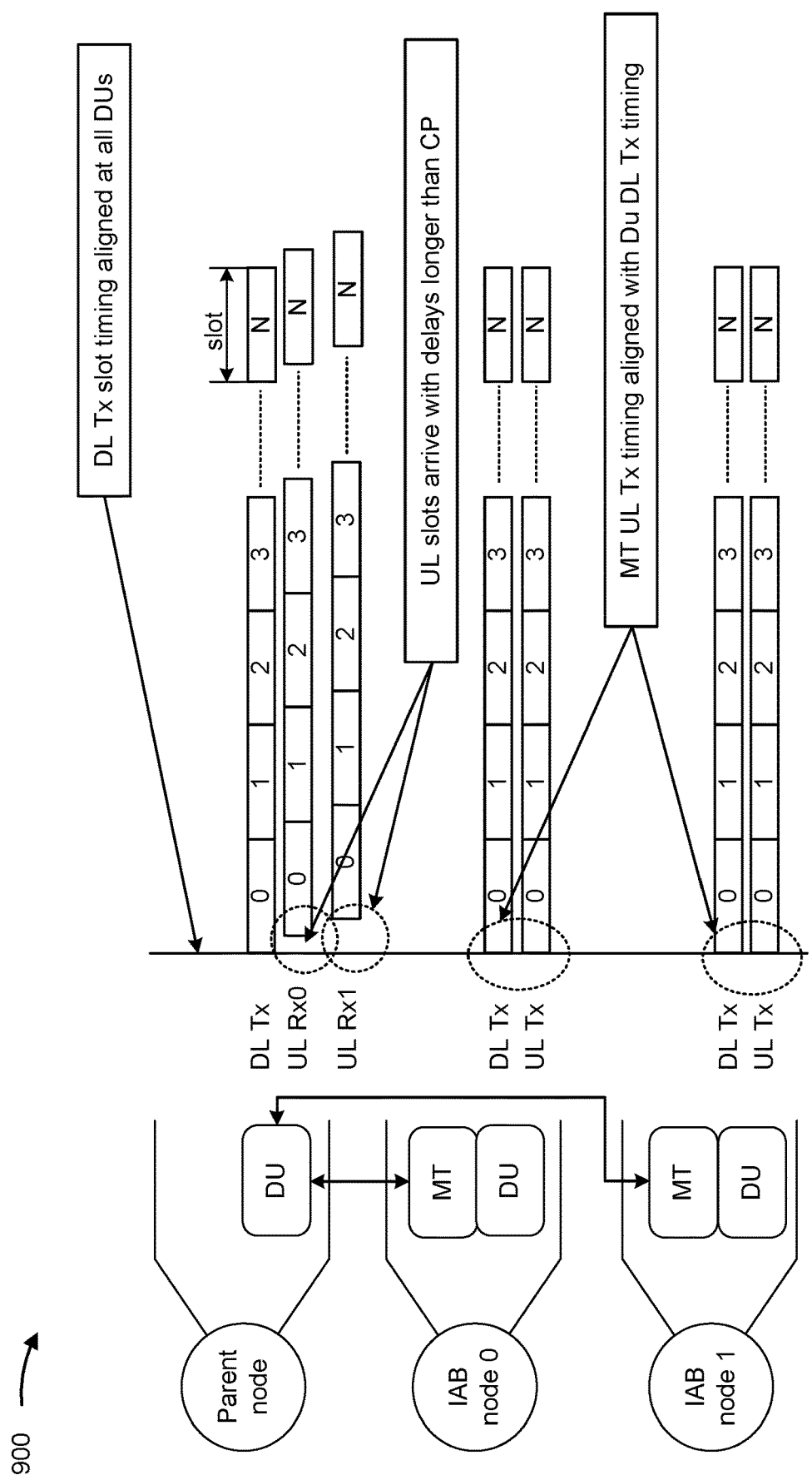
FIG. 9 is a diagram illustrating an example of node synchronization and timing alignment for IAB nodes, in accordance with the present disclosure.

FIG. 9 is a diagram illustrating an example 900 of node synchronization and timing alignment for IAB nodes, in accordance with the present disclosure. As shown in FIG. 9, the downlink transmission timing for all IAB nodes may be aligned with the parent IAB node or with donor downlink timing. In this example 900, the uplink transmission timing of an IAB node may not use the TA synchronization described herein and may instead be aligned with the IAB node DU downlink transmission.

As shown by example 900, a parent node may communicate with two child nodes (e.g., IAB node 0 and IAB node 1). In this example, the propagation delay between IAB node 0 and the parent node may be less than the propagation delay between IAB node 1 and the parent node (e.g., based at least in part on a distance between nodes, channel conditions, and/or the like). With uplink transmissions of each child node being aligned with the child node downlink transmissions, the longer propagation delay causes the parent node to receive the uplink communications with a delay, which may be longer than a GI or CP used on the uplink transmissions, and which may cause an FFT block to fall outside the FFT window at the parent node, which may require additional FFT processes and/or may cause interference.

As indicated, differences in timing between uplink and downlink transmissions in a network of IAB nodes may cause communications to be received outside of a GI or CP, which may cause interference and/or may require additional processing (e.g., additional FFT processing) by the receiver. In addition, IAB operation in mmW bands with large subcarrier spacing (SCS), the propagation delays from the IAB nodes to their parents may exceed GI or CP length. While separate receiver timings could be maintained at a parent node for uplink transmissions from different child IAB nodes, this may result in performance loss and additional processing complexity, as the received signals from different IAB nodes are not orthogonal and multiple FFT operations may be required.

As indicated above, FIG. 9 is provided as an example. Other examples may differ from what is described with respect to FIG. 9.

Some techniques and apparatuses described herein enable IAB nodes to communicate using node specific GIs to align IAB node communications. For example, an IAB node may be configured to receive an uplink communication using a first guard interval and downlink communications using a second guard interval that is different from the first guard interval. The different GIs may enable the IAB node to process the uplink and downlink communications in the same FFT window. As another example, an IAB donor may configure different GIs for child IAB nodes (e.g., configuring different guard interval lengths based on propagation delay associated with the child IAB node). In addition, an IAB parent node may configure different child IAB nodes with different GIs (e.g., based on propagation delay), enabling the IAB parent node to receive aligned uplink communications from the different child IAB nodes. Moreover, an IAB node may use different GIs to achieve symbol level alignment for full duplex communications of the IAB node.

As a result, different GIs may align communications for IAB nodes, which may reduce interference and enable the IAB nodes to process multiple communications in the same FFT window. As a result, the reduction in interference may improve the quality of communications in an IAB network, reducing bandwidth that would be wasted on retransmitting interfering signals. In addition, the ability to use one FFT window for processing multiple communications may improve the processing efficiency of IAB nodes that receive multiple communications that are aligned using node specific GIs. Reducing the need for additional transmissions and/or additional processing may also conserve power resources consumed by IAB transmitters and IAB receivers. Furthermore, by using node and/or link specific GIs, rather than a fixed GI or CP for all communications, overhead may be reduced by enabling some communications to use a shorter GI, which may enable the communications using the short GI to include more data per symbol, reducing overhead and increasing efficiency.

Figure 10:
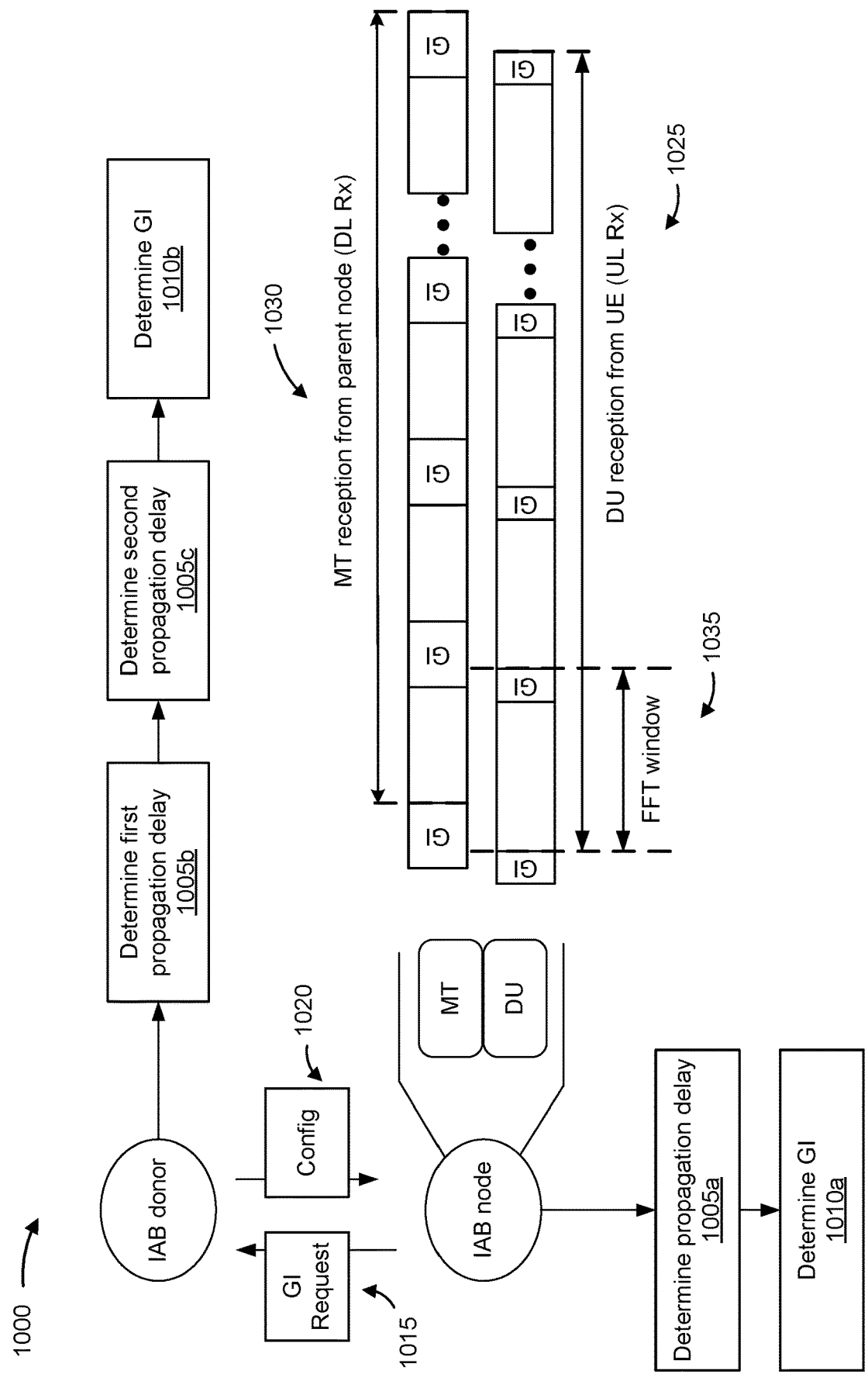
FIG. 10 is a diagram illustrating an example associated with an IAB node processing communications with different guard intervals (GIs), in accordance with the present disclosure.

FIG. 10 is a diagram illustrating an example 1000 associated with an IAB node processing communications with different GIs, in accordance with the present disclosure. As shown in FIG. 10, an IAB node may communicate with an IAB donor and receive communications from a parent node and a UE. In some aspects, the parent node may be the IAB donor. As used herein, determining a GI may include determining a length of the GI.

As shown by reference numbers 1005a, 1005b, and 1005c, the IAB node and/or the IAB donor may determine a propagation delay associated with one or more communications between the IAB node and the IAB donor. The propagation delay may be determined, for example based on one or more reference signals transmitted between the IAB node and the IAB donor, as described herein. In some aspects, the propagation delay may be determined during a RACH procedure. In some aspects, the propagation delay may be determined via an over the air (OTA) synchronization procedure associated with the IAB node and the IAB donor.

In some aspects, the IAB node and/or IAB donor may determine a first propagation delay associated with downlink communications with the IAB node and a second propagation delay associated with uplink communications from the IAB node. Determining propagation delay between the IAB node and the IAB donor may enable the IAB node and/or IAB donor to determine a GI for communications between the IAB node and the IAB donor.

As shown by reference numbers 1010a and 1010b, the IAB node and/or the IAB donor may determine a GI (e.g., determine a length of the GI) for downlink communications from the IAB donor to the IAB node based at least in part on the propagation delay. For example, a length of the GI may be based at least in part on the propagation delay (e.g., longer delay may lead to greater GI length). In some aspects, propagation delay is measured on the uplink and the downlink between the IAB node and the IAB donor, and the uplink and downlink propagation delay may be used to determine a length of the GI. For example, the length of the GI may be based at least in part on the highest propagation delay between the uplink and downlink propagation delay. In some aspects, the IAB node may determine the GI based at least in part on an uplink transmission from another IAB node or a UE. For example, the IAB node may be capable of configuring the GI that a UE uses to transmit uplink communications to the IAB node and be aware of expected timing associated with receipt of the uplink communications from the UE. In this situation, the IAB node may determine the GI for downlink communications from the IAB in a manner designed to ensure the GI is sufficient to align the downlink communications with the uplink communications from the UE.

As shown by reference number 1015, the IAB node may transmit, and the IAB donor may receive, data indicating the length of the GI for downlink communications between the IAB donor and the IAB node. In some aspects, the data indicating the length of the GI may be included in a request transmitted by the IAB node. In some aspects, the request may be an indirect request (e.g., a reference signal) that the IAB donor uses to determine the length of the GI.

As shown by reference number 1020, the IAB donor may transmit, and the IAB node may receive, configuration information indicating the GI. For example, as described herein, the IAB donor may configure the length of the GI to the IAB node on a downlink signal via the F1 interface. Configuring the IAB node with the length of the GI enables the IAB node to process downlink communications transmitted from the IAB donor or a parent IAB node to the IAB node. In some aspects, the IAB donor may configure itself and/or a parent IAB node of the IAB node to use the GI when transmitting downlink communications to the IAB node.

As shown by reference number 1025, the IAB node may receive, from a first wireless device, an uplink communication using a first GI. For example, the wireless device may be a UE or a child IAB node of the IAB node.

As shown by reference number 1030, the IAB node may receive, from a second wireless device, a downlink communication using a second GI. For example, the wireless device may be a parent IAB node or an IAB donor. In some aspects, the length of the second GI is different from the length of the first GI. In some aspects, the length of the second GI may be greater than the length of the first GI. For example, the length of the second GI may be the GI configured for the IAB node based on the propagation delay. The length of the second GI may be greater than the length of the first GI to enable the IAB node to receive both the uplink and downlink communications in a same FFT window. For example, the symbols of the communications may be aligned within the same FFT window based at least in part on the GIs of the communications, as described herein.

As shown by reference number 1035, the IAB node may process the uplink communication and the downlink communication in the same FFT window. As described herein, the alignment of the uplink and downlink communications may enable the IAB node to process the communications with less interference and more efficiently than if the communications were not aligned.

As indicated above, FIG. 10 is provided as an example. Other examples may differ from what is described with respect to FIG. 10.

Figure 11:
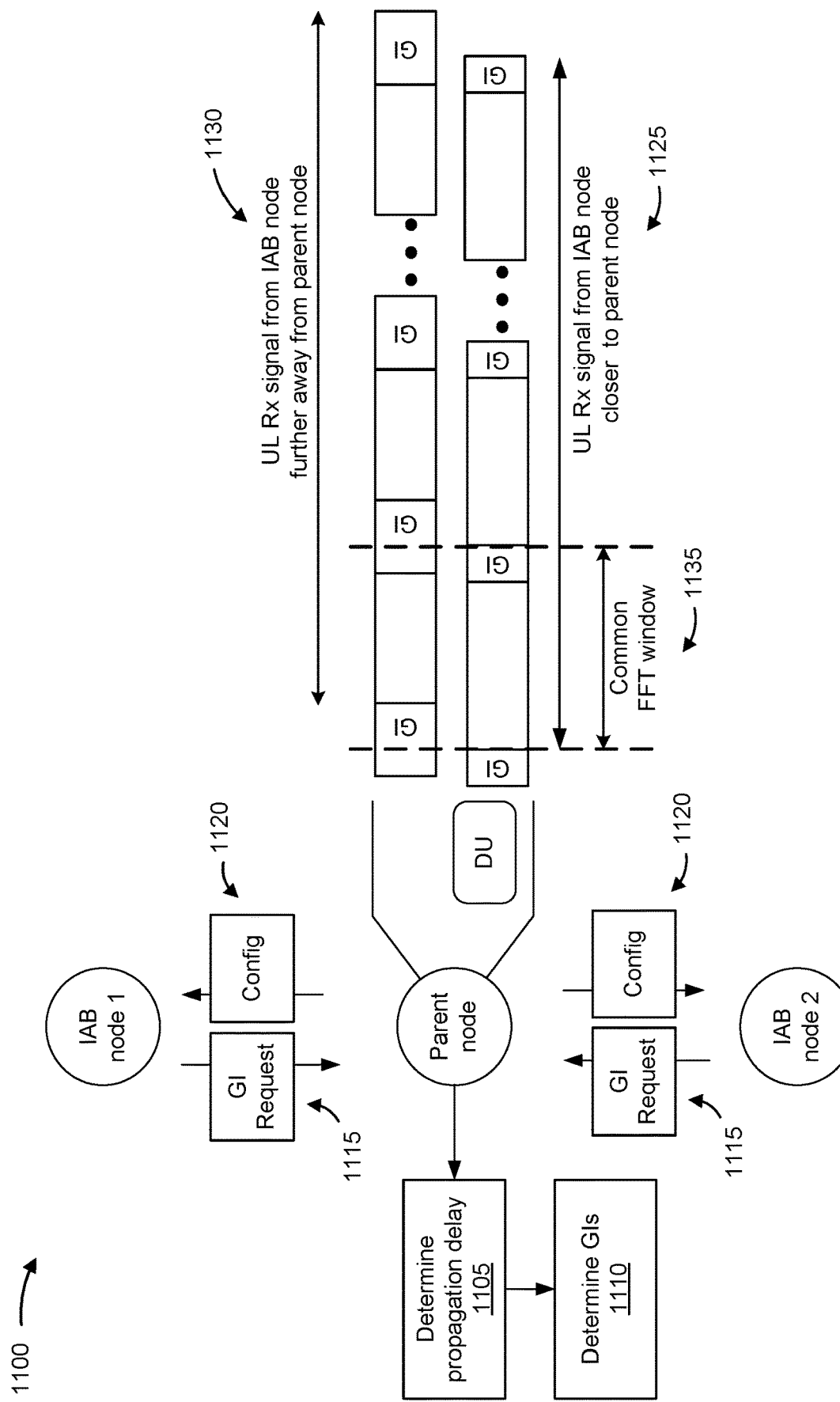
FIG. 11 is a diagram illustrating an example associated with a parent IAB node processing communications with different GIs, in accordance with the present disclosure.

FIG. 11 is a diagram illustrating an example 1100 associated with a parent IAB node processing communications with different GIs, in accordance with the present disclosure. As shown in FIG. 11, a parent IAB node may communicate with two child IAB nodes (e.g., IAB node 1 and IAB node 2). In some aspects, the parent node may be the IAB donor.

As shown by reference number 1105, the parent node may determine propagation delay associated with a first IAB node and a second IAB node. The parent node may determine the propagation delay for each of the first and second IAB nodes as described herein. In some aspects, the propagation delay for each IAB node may be determined during respective RACH procedures with the IAB nodes.

As shown by reference number 1110, the parent node may determine GIs for the first IAB node and the second IAB node. The parent node may determine the GIs as described herein. For example, the parent node may determine a first length of a first GI based at least in part on the propagation delay between the parent node and the first IAB node. The parent node may determine a second length of a second GI based at least in part on the propagation delay between the parent node and the second IAB node.

As shown by reference number 1115, the parent node may receive, from the first IAB node, data indicating the first length of the first GI (e.g., for uplink communications to the parent node from the first IAB node). In addition, the parent node may receive, from the second IAB node, data indicating the second length of the second GI (e.g., for uplink communications to the parent node from the second IAB node). As described herein, the data indicating the GI length may include a request from the IAB node for a particular GI length and/or a reference signal from which the parent node may determine the GI length, among other examples.

In some aspects, the parent node may determine a first measure of distance between the first IAB node and the parent node based at least in part on one or more reference signals. In some aspects, the parent node may determine a second measure of distance between the second IAB node and the parent node based at least in part on one or more other reference signals associated with the second IAB node. The parent node may determine the lengths of the GIs based at least in part on the measure(s) of distance for one or both of the IAB nodes, as described herein. For example, the parent node may determine that the first length of the first GI is greater than the second length of the second GI based at least in part on determining that the first measure of distance is greater than the second measure of distance (e.g., the first IAB node is further away from the parent node and experiences greater propagation delay than the second IAB node).

As shown by reference number 1120, the parent node may transmit first configuration information to the first IAB node and transmit second configuration information to the second IAB node. As described herein, the configuration information may indicate the length of the GI interval to be used by the respective IAB nodes when the IAB nodes transmit uplink communications to the parent node.

As shown by reference number 1125, the parent node receives, from the first IAB node, a first uplink communication using the first GI, as described herein.

As shown by reference number 1130, the parent node receives, from the second IAB node, a second uplink communication using the second GI, as described herein. The second length of the second GI may be different form the first length of the first GI, enabling the uplink communications to be received in the same FFT window, as described herein.

As shown by reference number 1135, the parent node may process the first uplink communication and the second uplink communication in the same FFT window, as described herein.

As indicated above, FIG. 11 is provided as an example. Other examples may differ from what is described with respect to FIG. 11.

Figure 12:
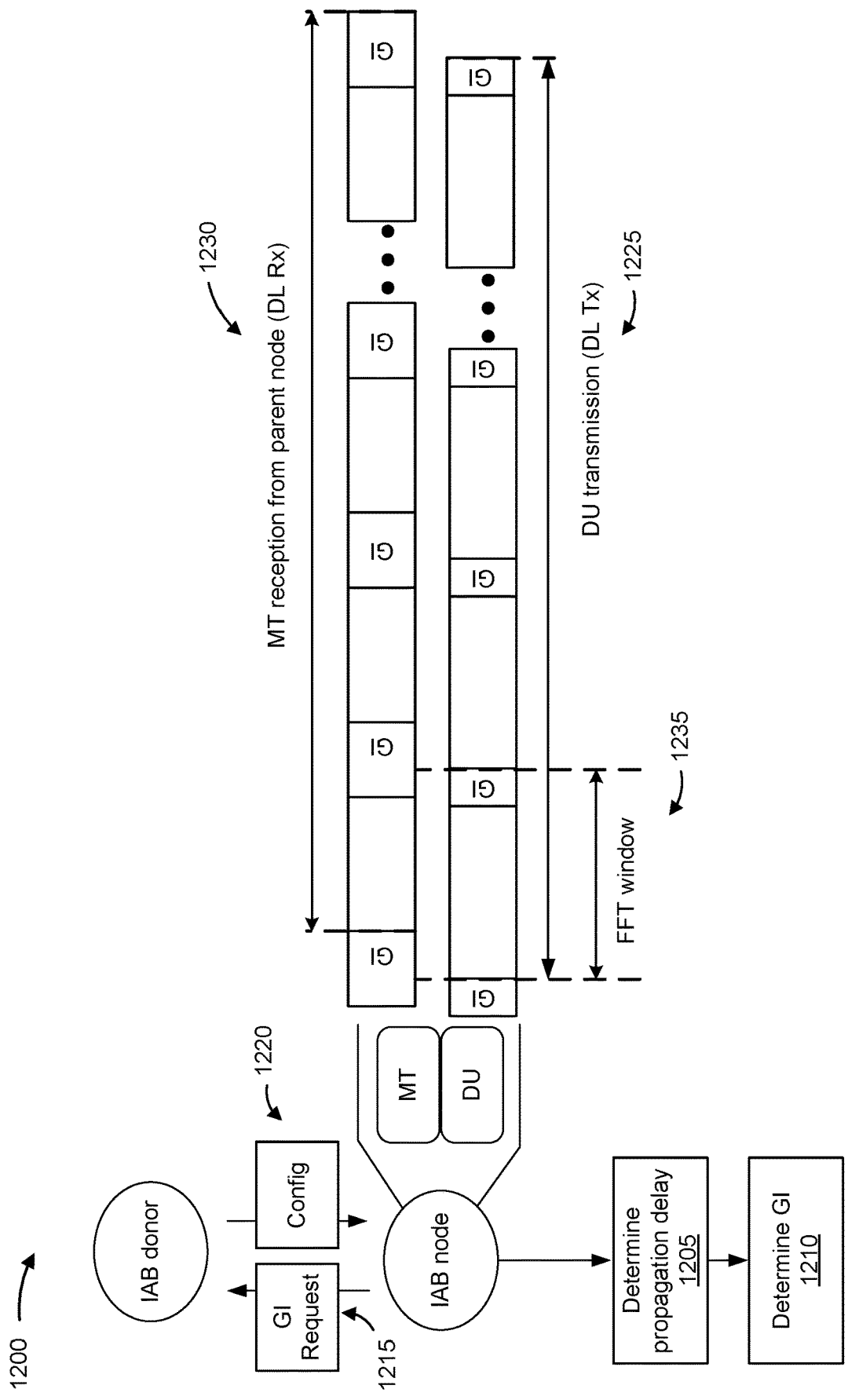
FIG. 12 is a diagram illustrating an example associated with full duplex downlink communications of an IAB node using node specific GIs, in accordance with the present disclosure.

FIG. 12 is a diagram illustrating an example 1200 associated with full duplex downlink communications of an IAB node using node specific GIs, in accordance with the present disclosure. As shown in FIG. 12, an IAB node may communicate with an IAB donor, a parent node (which may be the same as or different from the IAB donor) and another wireless device (e.g., another IAB node or a UE).

As shown by reference number 1205, the IAB node may determine propagation delay associated with the parent node of the IAB node, as described herein.

As shown by reference number 1210, the IAB node may determine a GI (e.g., for downlink communications from the parent node) based at least in part on the propagation delay, as described herein.

As shown by reference number 1215, the IAB node may transmit, to the IAB donor, data indicating the GI, as described herein.

As shown by reference number 1220, the IAB node may receive, from the IAB donor, configuration information indicating the GI to be used for downlink communications transmitted by the parent node, as described herein.

As shown by reference number 1225, the IAB node may transmit, to a wireless device (e.g., a child node or a UE) and during an FFT window, a downlink communication. For example, the downlink communication may be transmitted with a first GI, as described herein.

As shown by reference number 1230, the IAB node may receive, from the parent node and during the FFT window, a downlink communication using a second GI. For example, the second GI may be the GI determined by the IAB node and/or configured by the IAB donor, as described herein. In some aspects, a second length of the second GI may match (e.g., within a threshold) the first length of the first GI. For example, in a situation where the parent node is a full-duplex IAB node and the child node is a full-duplex IAB node, the GI lengths may be the same. In some aspects, as described herein, the first GI and second GI may be different (e.g., the length of the second GI may be greater than or less than the length of the first GI).

As shown by reference number 1235, the IAB node may receive and transmit downlink signals aligned in the same FFT window. In some aspects, the first GI and the second GI provide symbol-level alignment for the downlink communications, which may reduce interference associated with the communications, improve communication efficiency, and reduce resources used by IAB node and the devices communicating with the IAB node, as described herein.

As indicated above, FIG. 12 is provided as an example. Other examples may differ from what is described with respect to FIG. 12.

Figure 13:
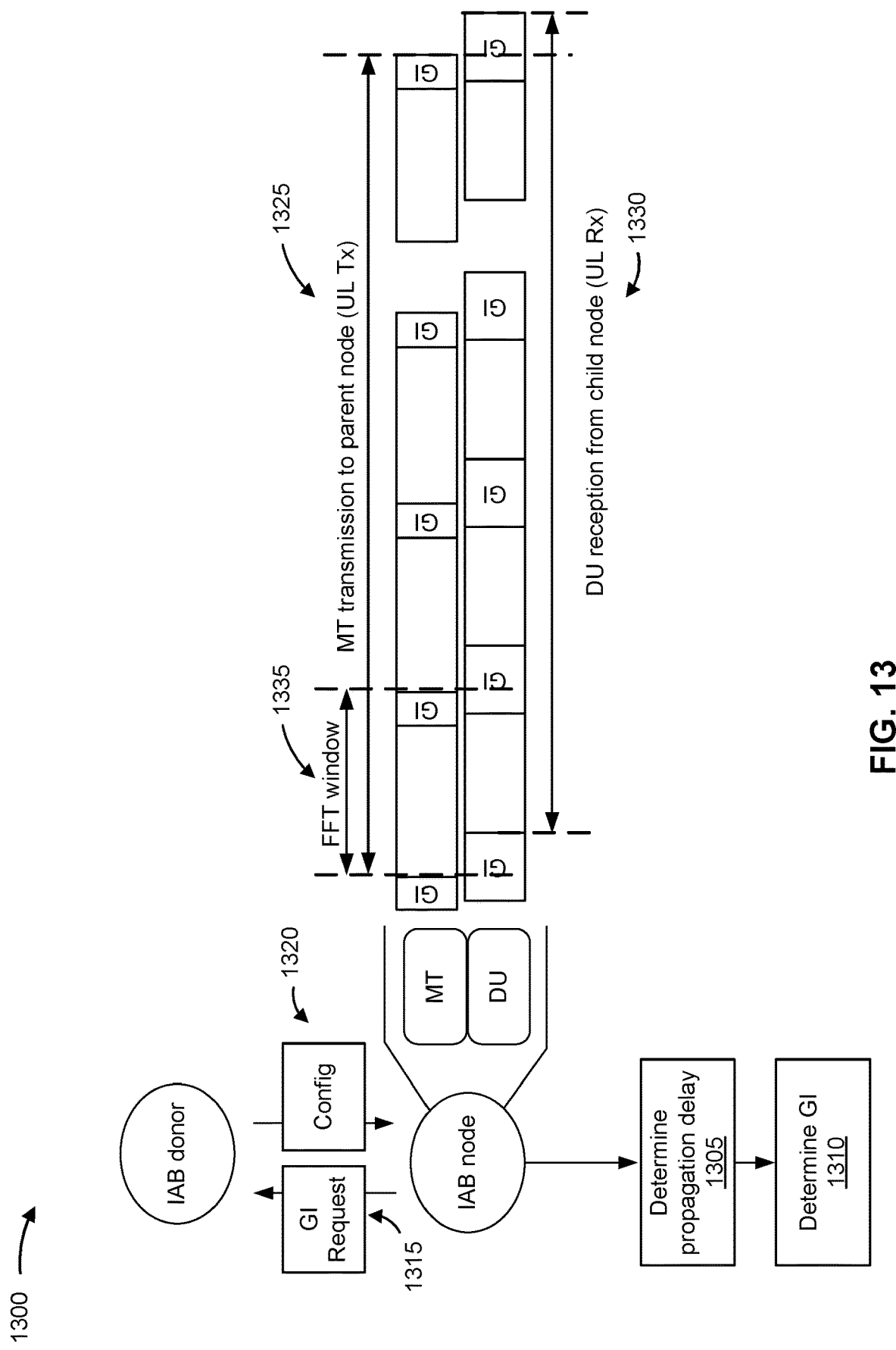
FIG. 13 is a diagram illustrating an example associated with full duplex uplink communications of an IAB node using node specific GIs, in accordance with the present disclosure.

FIG. 13 is a diagram illustrating an example 1300 associated with full duplex uplink communications of an IAB node using node specific GIs, in accordance with the present disclosure. As shown in FIG. 13, an IAB node may communicate with an IAB donor, a parent node (which may be the same as or different from the IAB donor) and another wireless device (e.g., another IAB node or a UE).

The actions shown by reference numbers 1305, 1310, 1315, and 1320 may be the same as or similar to the actions shown and described with respect to reference numbers 1205, 1210, 1215, and 1220, respectively, as described elsewhere herein. Accordingly, the IAB node may, for example, determine propagation delay, determine a GI associated with the parent node, and communicate with the IAB donor to obtain configuration information indicating the GI to be used for uplink communications from the IAB node to the parent node.

As shown by reference number 1325, the IAB node may transmit, to the parent node and during an FFT window, a first uplink communication using a first GI, as described herein.

As shown by reference number 1330, the IAB node may receive, from a child node of the IAB node and during the FFT window, a second uplink communication using a second GI, as described herein. In some aspects, a second length of the second GI may match (e.g., within a threshold) the first length of the first GI. For example, in a situation where the parent node is a full-duplex IAB node and the child node is a full-duplex IAB node, the GI lengths may be the same. In some aspects, as described herein, the first GI and second GI may be different (e.g., the length of the second GI may be greater than or less than the length of the first GI).

As shown by reference number 1335, the IAB node may receive and transmit the uplink signals in the same FFT window. In some aspects, the first GI and the second GI provide symbol-level alignment for the uplink communications, which may reduce interference associated with the communications, improve communication efficiency, and reduce resources used by IAB node and the devices communicating with the IAB node, as described herein.

As indicated above, FIG. 13 is provided as an example. Other examples may differ from what is described with respect to FIG. 13.

Figure 14:
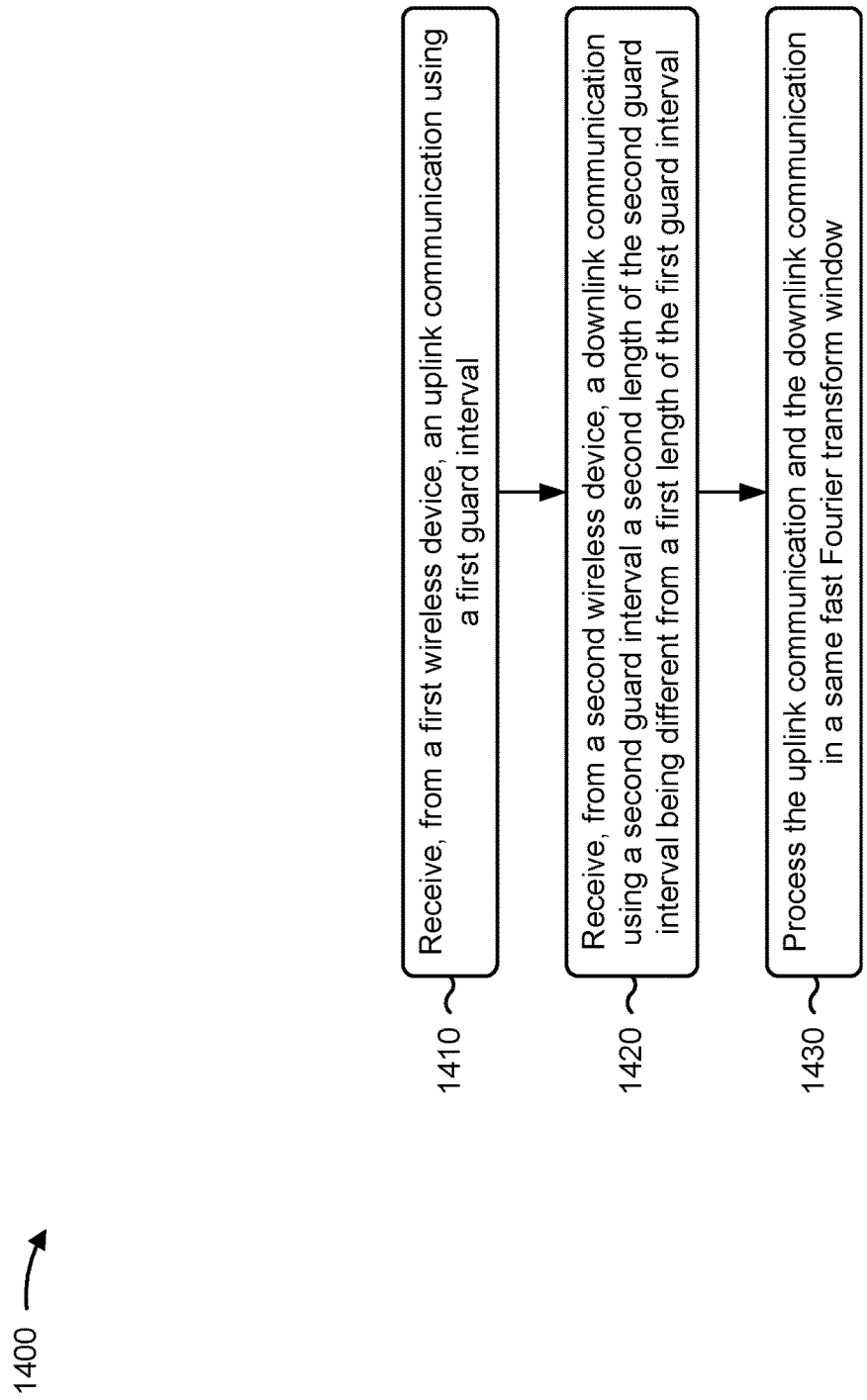
FIGS. 14-18 are diagrams illustrating example processes associated with integrated access and backhaul node specific guard intervals, in accordance with the present disclosure.

FIG. 14 is a diagram illustrating an example process 1400 performed, for example, by an IAB node, in accordance with the present disclosure. Example process 1400 is an example where the IAB node (e.g., base station 110) performs operations associated with integrated access and backhaul node specific GIs.

As shown in FIG. 14, in some aspects, process 1400 may include receiving, from a first wireless device, an uplink communication using a first guard interval (block 1410). For example, the IAB node (e.g., using communication manager 150 and/or reception component 1902, depicted in FIG. 19) may receive, from a first wireless device, an uplink communication using a first guard interval, as described above, for example, with reference to FIGS. 10, 11, 12, and/or 13.

As further shown in FIG. 14, in some aspects, process 1400 may include receiving, from a second wireless device, a downlink communication using a second guard interval, a second length of the second guard interval being different from a first length of the first guard interval (block 1420). For example, the IAB node (e.g., using communication manager 150 and/or reception component 1902, depicted in FIG. 19) may receive, from a second wireless device, a downlink communication using a second guard interval, a second length of the second guard interval being different from a first length of the first guard interval, as described above, for example, with reference to FIGS. 10, 11, 12, and/or 13.

As further shown in FIG. 14, in some aspects, process 1400 may include processing the uplink communication and the downlink communication in a same FFT window (block 1430). For example, the IAB node (e.g., using communication manager 150 and/or FFT component 1908, depicted in FIG. 19) may process the uplink communication and the downlink communication in a same FFT window, as described above, for example, with reference to FIGS. 10, 11, 12, and/or 13.

Process 1400 may include additional aspects, such as any single aspect or any combination of aspects described below and/or in connection with one or more other processes described elsewhere herein.

In a first aspect, the first wireless device is a user equipment, and the second wireless device is a parent IAB node.

In a second aspect, alone or in combination with the first aspect, the second length of the second guard interval is greater than the first length of the first guard interval.

In a third aspect, alone or in combination with one or more of the first and second aspects, process 1400 includes receiving, from an IAB donor, configuration information indicating the second length of the second guard interval.

In a fourth aspect, alone or in combination with one or more of the first through third aspects, process 1400 includes transmitting, to an IAB donor, a request indicating the second length of the second guard interval.

In a fifth aspect, alone or in combination with one or more of the first through fourth aspects, process 1400 includes determining a propagation delay associated with a communication with the IAB donor and determining the second length of the second guard interval based at least in part on the propagation delay.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
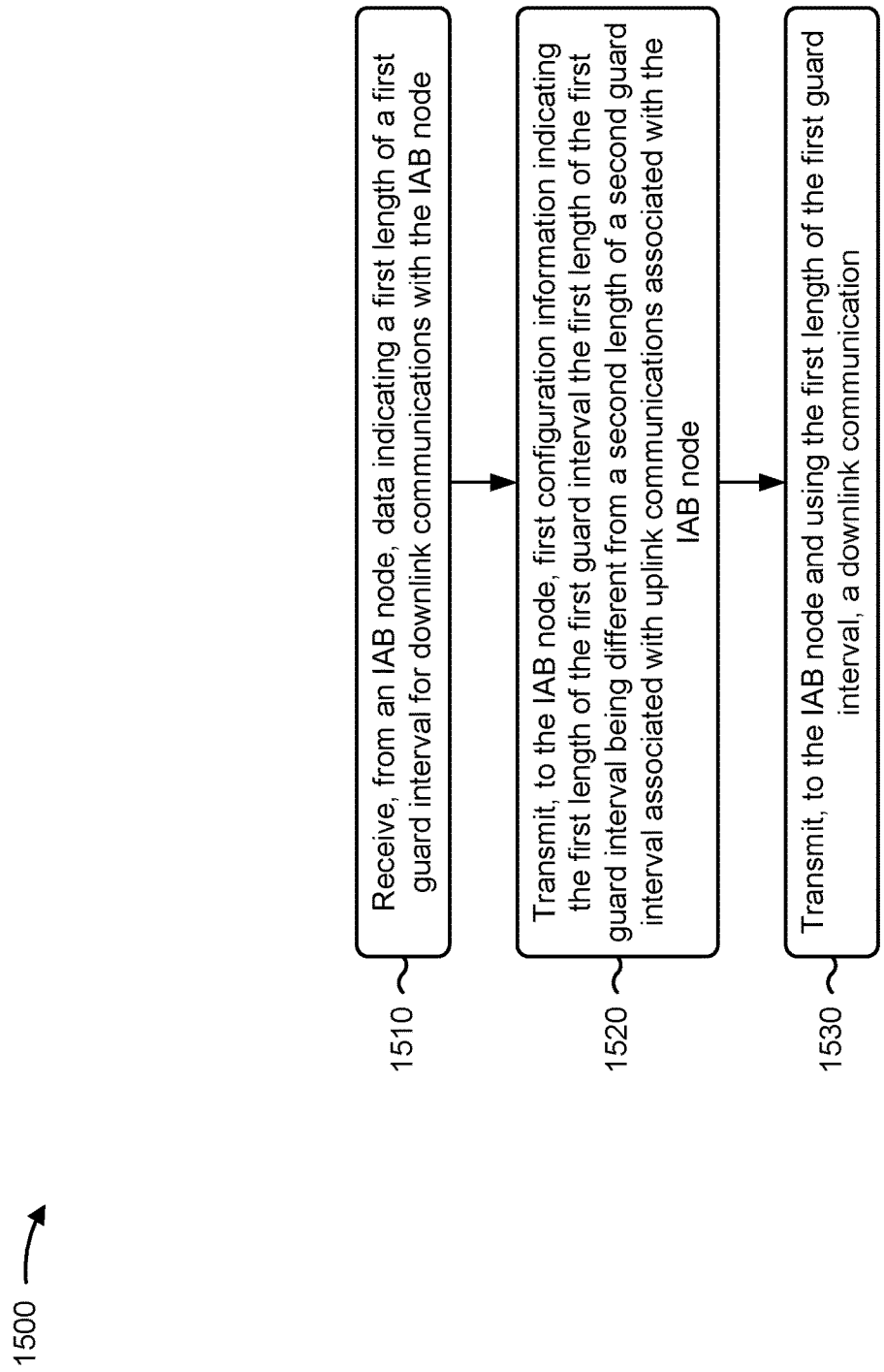

FIG. 15 is a diagram illustrating an example process 1500 performed, for example, by an IAB donor, in accordance with the present disclosure. Example process 1500 is an example where the IAB donor (e.g., base station 110) performs operations associated with integrated access and backhaul node specific guard intervals.

As shown in FIG. 15, in some aspects, process 1500 may include receiving, from an IAB node, data indicating a first length of a first guard interval for downlink communications with the IAB node (block 1510). For example, the IAB donor (e.g., using communication manager 150 and/or reception component 1902, depicted in FIG. 19) may receive, from an IAB node, data indicating a first length of a first guard interval for downlink communications with the IAB node, as described above, for example, with reference to FIGS. 10, 11, 12, and/or 13.

As further shown in FIG. 15, in some aspects, process 1500 may include transmitting, to the IAB node, first configuration information indicating the first length of the first guard interval, the first length of the first guard interval being different from a second length of a second guard interval associated with uplink communications associated with the IAB node (block 1520). For example, the IAB donor (e.g., using communication manager 150 and/or transmission component 1904, depicted in FIG. 19) may transmit, to the IAB node, first configuration information indicating the first length of the first guard interval, the first length of the first guard interval being different from a second length of a second guard interval associated with uplink communications associated with the IAB node, as described above, for example, with reference to FIGS. 10, 11, 12, and/or 13.

As further shown in FIG. 15, in some aspects, process 1500 may include transmitting, to the IAB node and using the first length of the first guard interval, a downlink communication (block 1530). For example, the IAB donor (e.g., using communication manager 150 and/or transmission component 1904, depicted in FIG. 19) may transmit, to the IAB node and using the first length of the first guard interval, a downlink communication, as described above, for example, with reference to FIGS. 10, 11, 12, and/or 13.

Process 1500 may include additional aspects, such as any single aspect or any combination of aspects described below and/or in connection with one or more other processes described elsewhere herein.

In a first aspect, the first length of the first guard interval is greater than the second length of the second guard interval.

In a second aspect, alone or in combination with the first aspect, the data indicating the first length of the first guard interval comprises a report from the IAB node that identifies a requested guard interval length.

In a third aspect, alone or in combination with one or more of the first and second aspects, process 1500 includes determining a first propagation delay associated with the downlink communications with the IAB node, determining a second propagation delay associated with uplink communications from the IAB node, and determining the first length of the first guard interval based at least in part on the first propagation delay and the second propagation delay.

In a fourth aspect, alone or in combination with one or more of the first through third aspects, the first propagation delay and the second propagation delay are determined during a random access procedure.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
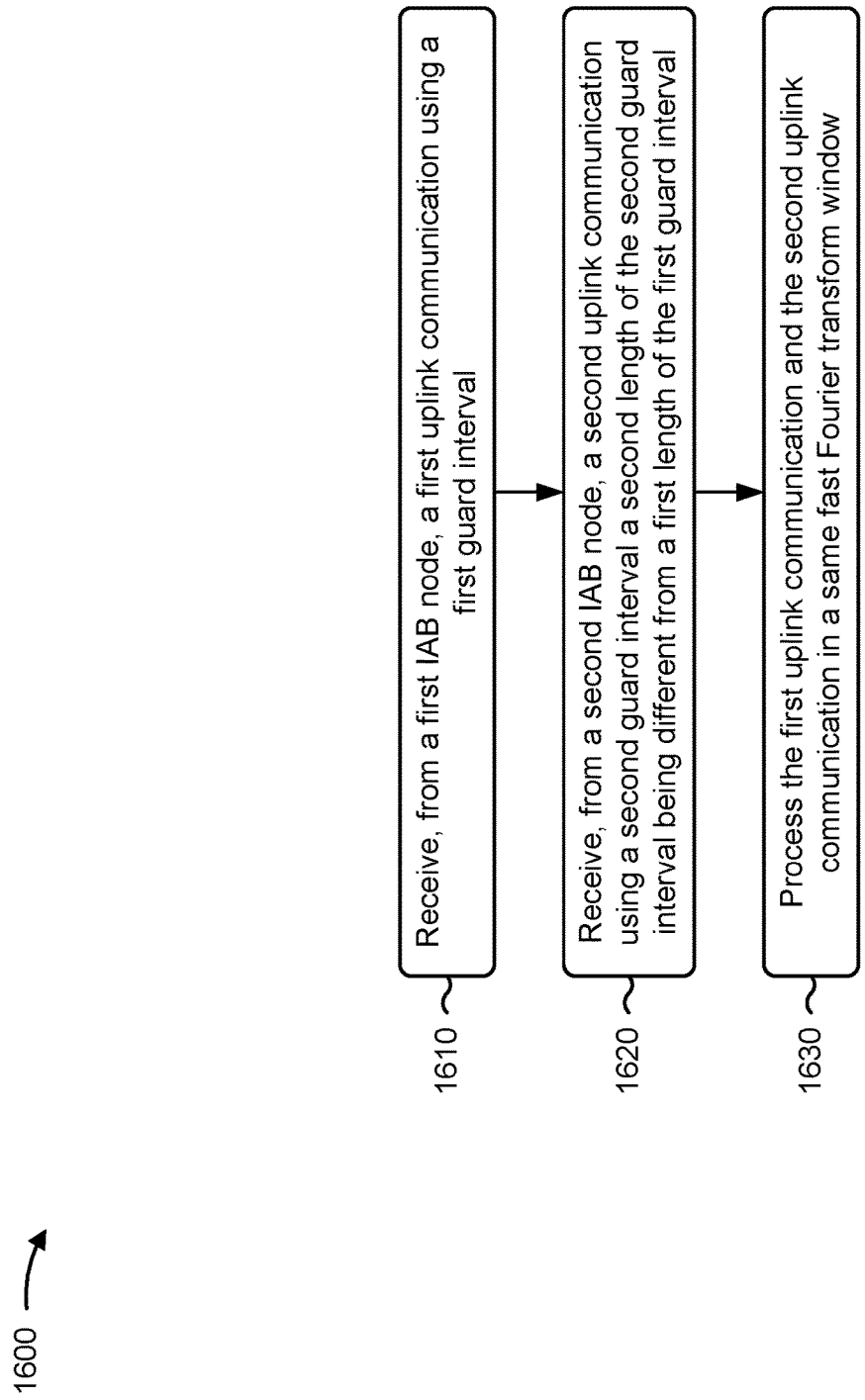

FIG. 16 is a diagram illustrating an example process 1600 performed, for example, by an IAB parent node, in accordance with the present disclosure. Example process 1600 is an example where the IAB parent node (e.g., base station 110) performs operations associated with integrated access and backhaul node specific GIs.

As shown in FIG. 16, in some aspects, process 1600 may include receiving, from a first IAB node, a first uplink communication using a first guard interval (block 1610). For example, the IAB parent node (e.g., using communication manager 150 and/or reception component 1902, depicted in FIG. 19) may receive, from a first IAB node, a first uplink communication using a first guard interval, as described above, for example, with reference to FIGS. 10, 11, 12, and/or 13.

As further shown in FIG. 16, in some aspects, process 1600 may include receiving, from a second IAB node, a second uplink communication using a second guard interval, a second length of the second guard interval being different from a first length of the first guard interval (block 1620). For example, the IAB parent node (e.g., using communication manager 150 and/or reception component 1902, depicted in FIG. 19) may receive, from a second IAB node, a second uplink communication using a second guard interval, a second length of the second guard interval being different from a first length of the first guard interval, as described above, for example, with reference to FIGS. 10, 11, 12, and/or 13.

As further shown in FIG. 16, in some aspects, process 1600 may include processing the first uplink communication and the second uplink communication in a same FFT window (block 1630). For example, the IAB parent node (e.g., using communication manager 150 and/or FFT component 1908, depicted in FIG. 19) may process the first uplink communication and the second uplink communication in a same FFT window, as described above, for example, with reference to FIGS. 10, 11, 12, and/or 13.

Process 1600 may include additional aspects, such as any single aspect or any combination of aspects described below and/or in connection with one or more other processes described elsewhere herein.

In a first aspect, process 1600 includes receiving, from the first IAB node, data indicating the first length of the first guard interval for first uplink communications to the IAB parent node from the first IAB node, and receiving, from the second IAB node, data indicating the second length of the second guard interval for second uplink communications to the IAB parent node from the second IAB node.

In a second aspect, alone or in combination with the first aspect, process 1600 includes transmitting, to the first IAB node, first configuration information indicating the first length of the first guard interval for first uplink communications to the IAB parent node from the first IAB node, and transmitting, to the second IAB node, second configuration information indicating the second length of the second guard interval for second uplink communications to the IAB parent node from the second IAB node.

In a third aspect, alone or in combination with one or more of the first and second aspects, process 1600 includes determining a first propagation delay associated with the first IAB node, determining a second propagation delay associated with the second IAB node, determining the first length of the first guard interval based at least in part on the first propagation delay, and determining the second length of the second guard interval based at least in part on the second propagation delay.

In a fourth aspect, alone or in combination with one or more of the first through third aspects, the first propagation delay and the second propagation delay are determined during random access procedures with the first IAB node and the second IAB node.

In a fifth aspect, alone or in combination with one or more of the first through fourth aspects, process 1600 includes receiving, from the first IAB node, one or more reference signals, determining a first measure of distance between the first IAB node and the IAB parent node based at least in part on the one or more reference signals, and determining the first length of the first guard interval based at least in part on the first measure of distance.

In a sixth aspect, alone or in combination with one or more of the first through fifth aspects, process 1600 includes determining that the first length of the first guard interval is greater than the second length of the second guard interval based at least in part on determining that the first measure of distance is greater than a second measure of distance between the second IAB node and the IAB parent node.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
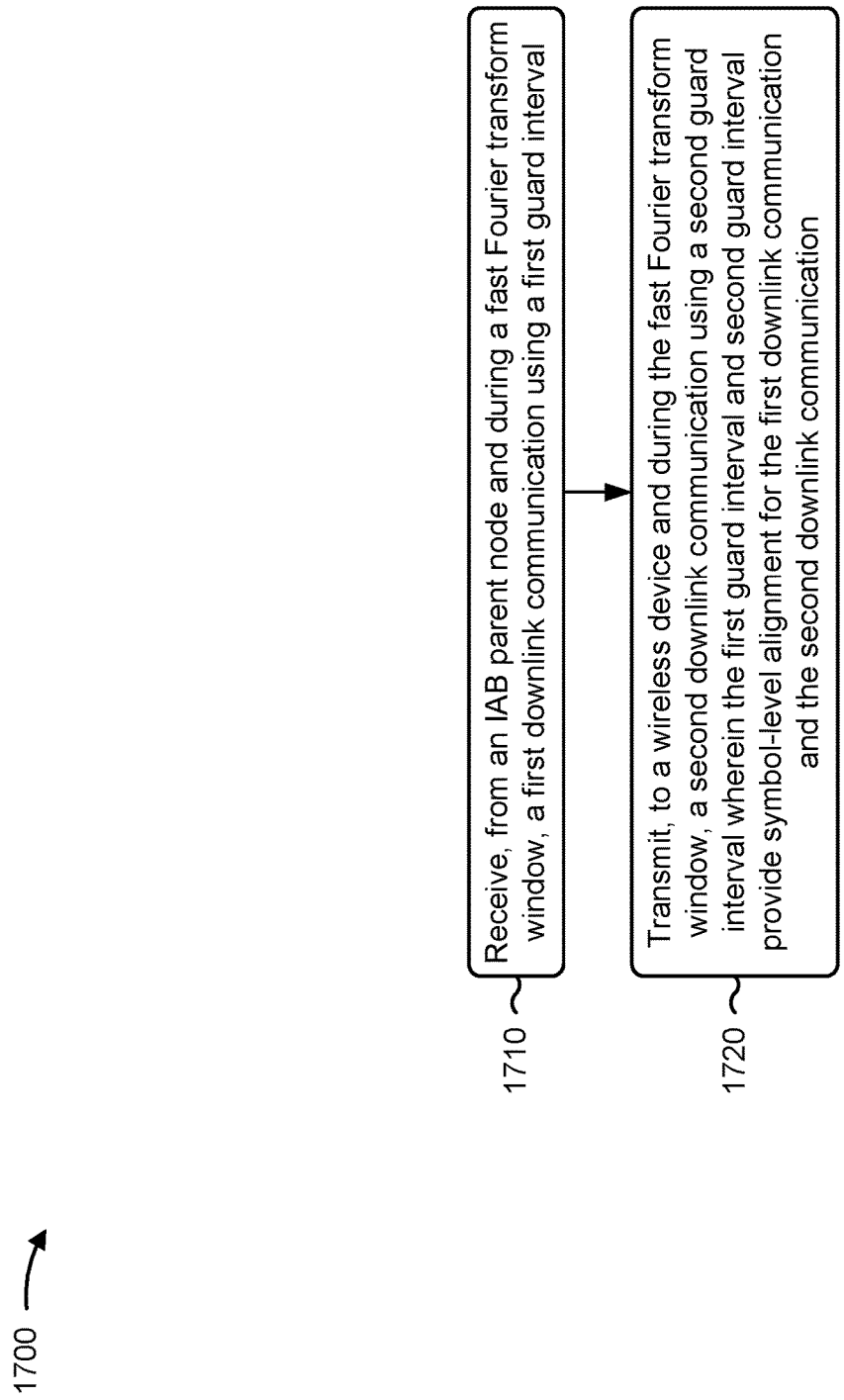

FIG. 17 is a diagram illustrating an example process 1700 performed, for example, by an IAB, in accordance with the present disclosure. Example process 1700 is an example where the IAB (e.g., base station 110) performs operations associated with integrated access and backhaul node specific GIs.

As shown in FIG. 17, in some aspects, process 1700 may include receiving, from an IAB parent node and during an FFT window, a first downlink communication using a first guard interval (block 1710). For example, the IAB (e.g., using communication manager 150 and/or reception component 1902, depicted in FIG. 19) may receive, from an IAB parent node and during an FFT window, a first downlink communication using a first guard interval, as described above, for example, with reference to FIGS. 10, 11, 12, and/or 13.

As further shown in FIG. 17, in some aspects, process 1700 may include transmitting, to a wireless device and during the FFT window, a second downlink communication using a second guard interval, wherein the first guard interval and second guard interval provide symbol-level alignment for the first downlink communication and the second downlink communication (block 1720). For example, the IAB (e.g., using communication manager 150 and/or transmission component 1904, depicted in FIG. 19) may transmit, to a wireless device and during the FFT window, a second downlink communication using a second guard interval, wherein the first guard interval and second guard interval provide symbol-level alignment for the first downlink communication and the second downlink communication, as described above, for example, with reference to FIGS. 10, 11, 12, and/or 13. In some aspects, the first guard interval and second guard interval provide symbol-level alignment for the first downlink communication and the second downlink communication.

Process 1700 may include additional aspects, such as any single aspect or any combination of aspects described below and/or in connection with one or more other processes described elsewhere herein.

In a first aspect, process 1700 includes receiving first configuration information indicating the first guard interval from an IAB donor.

In a second aspect, alone or in combination with the first aspect, process 1700 includes determining a propagation delay associated with the IAB parent node, determining a first length of the first guard interval based at least in part on the propagation delay, and transmitting, to the IAB donor, data indicating the first length of the first guard interval.

In a third aspect, alone or in combination with one or more of the first and second aspects, the wireless device is an IAB child node, and wherein a first length of the first guard interval matches a second length of the second guard interval.

In a fourth aspect, alone or in combination with one or more of the first through third aspects, the wireless device is a user equipment, and wherein a first length of the first guard interval is less than a second length of the second guard interval.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
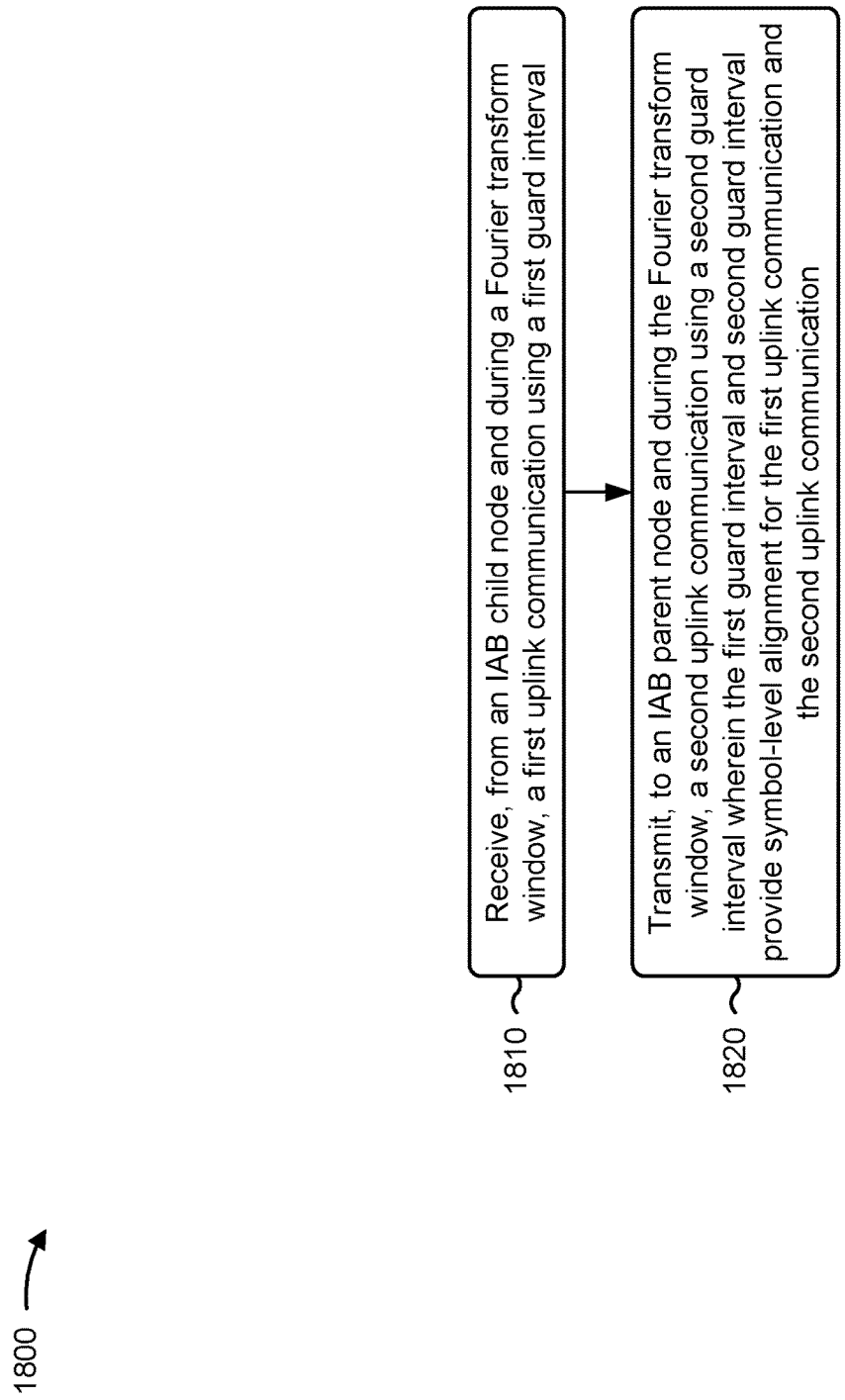

FIG. 18 is a diagram illustrating an example process 1800 performed, for example, by an IAB, in accordance with the present disclosure. Example process 1800 is an example where the IAB node (e.g., base station 110) performs operations associated with integrated access and backhaul node specific GIs.

As shown in FIG. 18, in some aspects, process 1800 may include receiving, from an IAB child node and during a Fourier transform window, a first uplink communication using a first guard interval (block 1810). For example, the IAB node (e.g., using communication manager 150 and/or reception component 1902, depicted in FIG. 19) may receive, from an IAB child node and during a Fourier transform window, a first uplink communication using a first guard interval, as described above, for example, with reference to FIGS. 10, 11, 12, and/or 13.

As further shown in FIG. 18, in some aspects, process 1800 may include transmitting, to an IAB parent node and during the Fourier transform window, a second uplink communication using a second guard interval, wherein the first guard interval and second guard interval provide symbol-level alignment for the first uplink communication and the second uplink communication (block 1820). For example, the IAB node (e.g., using communication manager 150 and/or transmission component 1904, depicted in FIG. 19) may transmit, to an IAB parent node and during the Fourier transform window, a second uplink communication using a second guard interval, wherein the first guard interval and second guard interval provide symbol-level alignment for the first uplink communication and the second uplink communication, as described above, for example, with reference to FIGS. 10, 11, 12, and/or 13. In some aspects, the first guard interval and second guard interval provide symbol-level alignment for the first uplink communication and the second uplink communication.

Process 1800 may include additional aspects, such as any single aspect or any combination of aspects described below and/or in connection with one or more other processes described elsewhere herein.

In a first aspect, process 1800 includes receiving first configuration information indicating the second guard interval from an IAB donor.

In a second aspect, alone or in combination with the first aspect, process 1800 includes determining a propagation delay associated with the IAB parent node, determining a second length of the second guard interval based at least in part on the propagation delay, and transmitting, to the IAB donor, data indicating the second length of the second guard interval.

In a third aspect, alone or in combination with one or more of the first and second aspects, the IAB parent node is not an IAB donor, and a first length of the first guard interval matches a second length of the second guard interval.

In a fourth aspect, alone or in combination with one or more of the first through third aspects, the IAB parent node is an IAB donor, and a first length of the first guard interval is greater than a second length of the second guard interval.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

Figure 19:
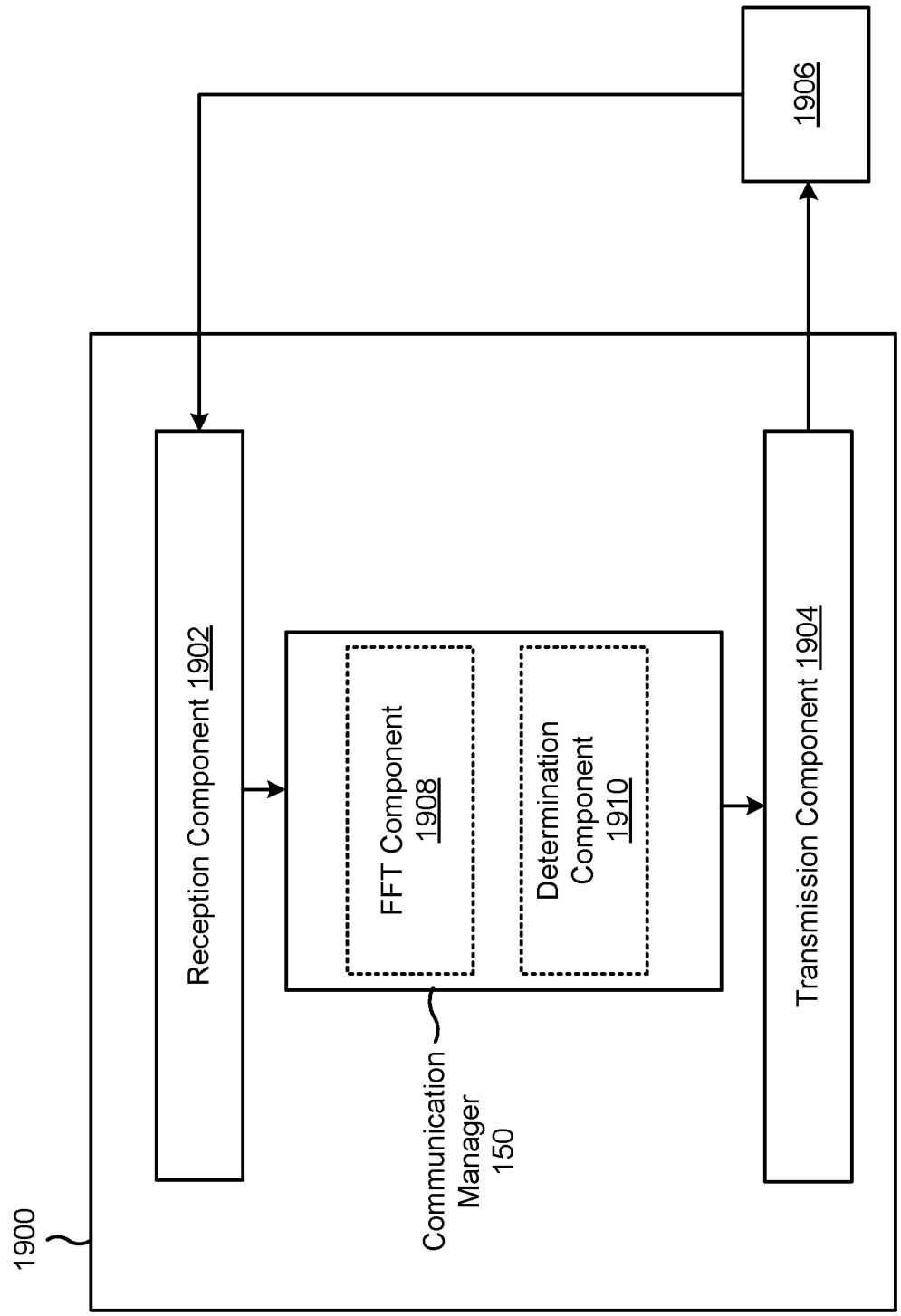
FIG. 19 is a diagram of an example apparatus for wireless communication, in accordance with the present disclosure.

FIG. 19 is a diagram of an example apparatus 1900 for wireless communication. The apparatus 1900 may be a base station (e.g., including an IAB node, IAB donor, parent node, child node, and/or the like), or a base station may include the apparatus 1900. In some aspects, the apparatus 1900 includes a reception component 1902 and a transmission component 1904, which may be in communication with one another (for example, via one or more buses and/or one or more other components). As shown, the apparatus 1900 may communicate with another apparatus 1906 (such as a UE, a base station, or another wireless communication device) using the reception component 1902 and the transmission component 1904. As further shown, the apparatus 1900 may include the communication manager 150. The communication manager 150 may include one or more of an FFT component 1908 or a determination component 1910, among other examples.

In some aspects, the apparatus 1900 may be configured to perform one or more operations described herein in connection with FIGS. 3-13. Additionally, or alternatively, the apparatus 1900 may be configured to perform one or more processes described herein, such as process 1400 of FIG. 14, process 1500 of FIG. 15, process 1600 of FIG. 16, process 1700 of FIG. 17, process 1800 of FIG. 18, or a combination thereof. In some aspects, the apparatus 1900 and/or one or more components shown in FIG. 19 may include one or more components of the base station described in connection with FIG. 2. Additionally, or alternatively, one or more components shown in FIG. 19 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1902 may receive communications, such as reference signals, control information, data communications, or a combination thereof, from the apparatus 1906. The reception component 1902 may provide received communications to one or more other components of the apparatus 1900. In some aspects, the reception component 1902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1900. In some aspects, the reception component 1902 may include one or more antennas, a modem, a demodulator, a MIMO detector, a receive processor, a controller/processor, a memory, or a combination thereof, of the base station described in connection with FIG. 2.

The transmission component 1904 may transmit communications, such as reference signals, control information, data communications, or a combination thereof, to the apparatus 1906. In some aspects, one or more other components of the apparatus 1900 may generate communications and may provide the generated communications to the transmission component 1904 for transmission to the apparatus 1906. In some aspects, the transmission component 1904 may perform signal processing on the generated communications (such as filtering, amplification, modulation, digital-to-analog conversion, multiplexing, interleaving, mapping, or encoding, among other examples), and may transmit the processed signals to the apparatus 1906. In some aspects, the transmission component 1904 may include one or more antennas, a modem, a modulator, a transmit MIMO processor, a transmit processor, a controller/processor, a memory, or a combination thereof, of the base station described in connection with FIG. 2. In some aspects, the transmission component 1904 may be co-located with the reception component 1902 in a transceiver.

The reception component 1902 may receive, from a first wireless device, an uplink communication using a first guard interval. The reception component 1902 may receive, from a second wireless device, a downlink communication using a second guard interval a second length of the second guard interval being different from a first length of the first guard interval. The FFT component 1908 may process the uplink communication and the downlink communication in a same FFT window.

The reception component 1902 may receive, from an IAB donor, configuration information indicating the second length of the second guard interval.

The transmission component 1904 may transmit, to an IAB donor, a request indicating the second length of the second guard interval.

The determination component 1910 may determine a propagation delay associated with a communication with the IAB donor. The determination component 1910 may determine the second length of the second guard interval based at least in part on the propagation delay.

The reception component 1902 may receive, from an IAB node, data indicating a first length of a first guard interval for downlink communications with the IAB node. The transmission component 1904 may transmit, to the IAB node, first configuration information indicating the first length of the first guard interval the first length of the first guard interval being different from a second length of a second guard interval associated with uplink communications associated with the IAB node. The transmission component 1904 may transmit, to the IAB node and using the first length of the first guard interval, a downlink communication.

The determination component 1910 may determine a first propagation delay associated with the downlink communications with the IAB node. The determination component 1910 may determine a second propagation delay associated with uplink communications from the IAB node. The determination component 1910 may determine the first length of the first guard interval based at least in part on the first propagation delay and the second propagation delay.

The reception component 1902 may receive, from a first IAB node, a first uplink communication using a first guard interval. The reception component 1902 may receive, from a second IAB node, a second uplink communication using a second guard interval a second length of the second guard interval being different from a first length of the first guard interval. The FFT component 1908 may process the first uplink communication and the second uplink communication in a same FFT window.

The reception component 1902 may receive, from the first IAB node, data indicating the first length of the first guard interval for first uplink communications to the IAB parent node from the first IAB node. The reception component 1902 may receive, from the second IAB node, data indicating the second length of the second guard interval for second uplink communications to the IAB parent node from the second IAB node.

The transmission component 1904 may transmit, to the first IAB node, first configuration information indicating the first length of the first guard interval for first uplink communications to the IAB parent node from the first IAB node. The transmission component 1904 may transmit, to the second IAB node, second configuration information indicating the second length of the second guard interval for second uplink communications to the IAB parent node from the second IAB node.

The determination component 1910 may determine a first propagation delay associated with the first IAB node. The determination component 1910 may determine a second propagation delay associated with the second IAB node. The determination component 1910 may determine the first length of the first guard interval based at least in part on the first propagation delay. The determination component 1910 may determine the second length of the second guard interval based at least in part on the second propagation delay.

The reception component 1902 may receive, from the first IAB node, one or more reference signals.

The determination component 1910 may determine a first measure of distance between the first IAB node and the IAB parent node based at least in part on the one or more reference signals. The determination component 1910 may determine the first length of the first guard interval based at least in part on the first measure of distance. The determination component 1910 may determine that the first length of the first guard interval is greater than the second length of the second guard interval based at least in part on determining that the first measure of distance is greater than a second measure of distance between the second IAB node and the IAB parent node.

The reception component 1902 may receive, from an IAB parent node and during an FFT window, a first downlink communication using a first guard interval. The transmission component 1904 may transmit, to a wireless device and during the FFT window, a second downlink communication using a second guard interval wherein the first guard interval and second guard interval provide symbol-level alignment for the first downlink communication and the second downlink communication.

The reception component 1902 may receive first configuration information indicating the first guard interval from an IAB donor.

The determination component 1910 may determine a propagation delay associated with the IAB parent node. The determination component 1910 may determine a first length of the first guard interval based at least in part on the propagation delay.

The transmission component 1904 may transmit, to the IAB donor, data indicating the first length of the first guard interval.

The reception component 1902 may receive, from an IAB child node and during a Fourier transform window, a first uplink communication using a first guard interval. The transmission component 1904 may transmit, to an IAB parent node and during the Fourier transform window, a second uplink communication using a second guard interval wherein the first guard interval and second guard interval provide symbol-level alignment for the first uplink communication and the second uplink communication.

The reception component 1902 may receive first configuration information indicating the second guard interval from an IAB donor.

The determination component 1910 may determine a second length of the second guard interval based at least in part on the propagation delay.

The transmission component 1904 may transmit, to the IAB donor, data indicating the second length of the second guard interval.

The number and arrangement of components shown in FIG. 19 are provided as an example. In practice, there may be additional components, fewer components, different components, or differently arranged components than those shown in FIG. 19. Furthermore, two or more components shown in FIG. 19 may be implemented within a single component, or a single component shown in FIG. 19 may be implemented as multiple, distributed components. Additionally, or alternatively, a set of (one or more) components shown in FIG. 19 may perform one or more functions described as being performed by another set of components shown in FIG. 19.

The following provides an overview of some Aspects of the present disclosure:

Aspect 1: A method of wireless communication performed by an integrated access and backhaul (IAB) node, comprising: receiving, from a first wireless device, an uplink communication using a first guard interval; receiving, from a second wireless device, a downlink communication using a second guard interval, a second length of the second guard interval being different from a first length of the first guard interval; and processing the uplink communication and the downlink communication in a same FFT window.

Aspect 2: The method of Aspect 1, wherein the first wireless device is a user equipment, and the second wireless device is a parent IAB node.

Aspect 3: The method of any of Aspects 1-2, wherein the second length of the second guard interval is greater than the first length of the first guard interval.

Aspect 4: The method of any of Aspects 1-3, further comprising: receiving, from an IAB donor, configuration information indicating the second length of the second guard interval.

Aspect 5: The method of any of Aspects 1-4, further comprising: transmitting, to an IAB donor, a request indicating the second length of the second guard interval.

Aspect 6: The method of Aspect 5, further comprising: determining a propagation delay associated with a communication with the IAB donor; and determining the second length of the second guard interval based at least in part on the propagation delay.

Aspect 7: A method of wireless communication performed by an IAB donor, comprising: receiving, from an IAB node, data indicating a first length of a first guard interval for downlink communications with the IAB node; transmitting, to the IAB node, first configuration information indicating the first length of the first guard interval, the first length of the first guard interval being different from a second length of a second guard interval associated with uplink communications associated with the IAB node; and transmitting, to the IAB node and using the first length of the first guard interval, a downlink communication.

Aspect 8: The method of Aspect 7, wherein the first length of the first guard interval is greater than the second length of the second guard interval.

Aspect 9: The method of any of Aspects 7-8, wherein the data indicating the first length of the first guard interval comprises a report from the IAB node that identifies a requested guard interval length.

Aspect 10: The method of any of Aspects 7-8, further comprising: determining a first propagation delay associated with the downlink communications with the IAB node; determining a second propagation delay associated with uplink communications from the IAB node; and determining the first length of the first guard interval based at least in part on the first propagation delay and the second propagation delay.

Aspect 11: The method of Aspect 10, wherein the first propagation delay and the second propagation delay are determined during a random access procedure.

Aspect 12: A method of wireless communication performed by an IAB parent node, comprising: receiving, from a first IAB node, a first uplink communication using a first guard interval; receiving, from a second IAB node, a second uplink communication using a second guard interval, a second length of the second guard interval being different from a first length of the first guard interval; and processing the first uplink communication and the second uplink communication in a same FFT window.

Aspect 13: The method of Aspect 12, further comprising: receiving, from the first IAB node, data indicating the first length of the first guard interval for first uplink communications to the IAB parent node from the first IAB node; and receiving, from the second IAB node, data indicating the second length of the second guard interval for second uplink communications to the IAB parent node from the second IAB node.

Aspect 14: The method of any of Aspects 12-13, further comprising: transmitting, to the first IAB node, first configuration information indicating the first length of the first guard interval for first uplink communications to the IAB parent node from the first IAB node; and transmitting, to the second IAB node, second configuration information indicating the second length of the second guard interval for second uplink communications to the IAB parent node from the second IAB node.

Aspect 15: The method of Aspect 14, further comprising: determining a first propagation delay associated with the first IAB node; determining a second propagation delay associated with the second IAB node; determining the first length of the first guard interval based at least in part on the first propagation delay; and determining the second length of the second guard interval based at least in part on the second propagation delay.

Aspect 16: The method of Aspect 15, wherein the first propagation delay and the second propagation delay are determined during random access procedures with the first IAB node and the second IAB node.

Aspect 17: The method of any of Aspects 12-16, further comprising: receiving, from the first IAB node, one or more reference signals; determining a first measure of distance between the first IAB node and the IAB parent node based at least in part on the one or more reference signals; and determining the first length of the first guard interval based at least in part on the first measure of distance.

Aspect 18: The method of Aspect 17, further comprising: determining that the first length of the first guard interval is greater than the second length of the second guard interval based at least in part on determining that the first measure of distance is greater than a second measure of distance between the second IAB node and the IAB parent node.

Aspect 19: A method of wireless communication performed by an IAB node, comprising: receiving, from an IAB parent node and during an FFT window, a first downlink communication using a first guard interval; and transmitting, to a wireless device and during the FFT window, a second downlink communication using a second guard interval, wherein the first guard interval and second guard interval provide symbol-level alignment for the first downlink communication and the second downlink communication.

Aspect 20: The method of Aspect 19, further comprising: receiving first configuration information indicating the first guard interval from an IAB donor.

Aspect 21: The method of Aspect 20, further comprising: determining a propagation delay associated with the IAB parent node; determining a first length of the first guard interval based at least in part on the propagation delay; and transmitting, to the IAB donor, data indicating the first length of the first guard interval.

Aspect 22: The method of any of Aspects 19-21, wherein the wireless device is an IAB child node, and wherein a first length of the first guard interval matches a second length of the second guard interval.

Aspect 23: The method of any of Aspects 19-22, wherein the wireless device is a user equipment, and wherein a first length of the first guard interval is less than a second length of the second guard interval.

Aspect 24: The method of any of Aspects 19-23, further comprising: receiving, from an IAB child node and during an other fast Fourier transform window, a first uplink communication using a third guard interval; and transmitting, to the IAB parent node and during the other Fourier transform window, a second uplink communication using a fourth guard interval, wherein the third guard interval and fourth guard interval provide symbol-level alignment for the first uplink communication and the second uplink communication.

Aspect 25: The method of Aspect 24, further comprising: receiving second configuration information indicating the fourth guard interval from an IAB donor.

Aspect 26: The method of Aspect 25, further comprising: determining a propagation delay associated with the IAB parent node; and determining a fourth length of the fourth guard interval based at least in part on the propagation delay.

Aspect 27: The method of Aspect 26, further comprising: transmitting, to the IAB donor, data indicating the fourth length of the fourth guard interval.

Aspect 28: The method of any of Aspects 24-27, wherein the IAB parent node is not an IAB donor, and a third length of the third guard interval matches a fourth length of the fourth guard interval.

Aspect 29: The method of any of Aspects 24-27, wherein the IAB parent node is an IAB donor, and a third length of the third guard interval is greater than a fourth length of the fourth guard interval.

Aspect 30: A method of wireless communication performed by an IAB node, comprising: receiving, from an IAB child node and during a Fourier transform window, a first uplink communication using a first guard interval; and transmitting, to an IAB parent node and during the Fourier transform window, a second uplink communication using a second guard interval, wherein the first guard interval and second guard interval provide symbol-level alignment for the first uplink communication and the second uplink communication.

Aspect 31: The method of Aspect 30, further comprising: receiving first configuration information indicating the second guard interval from an IAB donor.

Aspect 32: The method of Aspect 31, further comprising: determining a propagation delay associated with the IAB parent node; determining a second length of the second guard interval based at least in part on the propagation delay; and transmitting, to the IAB donor, data indicating the second length of the second guard interval.

Aspect 33: The method of any of Aspects 30-32, wherein the IAB parent node is not an IAB donor, and a first length of the first guard interval matches a second length of the second guard interval.

Aspect 34: The method of any of Aspects 30-33, wherein the IAB parent node is an IAB donor, and a first length of the first guard interval is greater than a second length of the second guard interval.

Aspect 35: An apparatus for wireless communication at a device, comprising a processor; memory coupled with the processor; and instructions stored in the memory and executable by the processor to cause the apparatus to perform the method of one or more of Aspects 1-6.

Aspect 36: An apparatus for wireless communication at a device, comprising a processor; memory coupled with the processor; and instructions stored in the memory and executable by the processor to cause the apparatus to perform the method of one or more of Aspects 7-11.

Aspect 37: An apparatus for wireless communication at a device, comprising a processor; memory coupled with the processor; and instructions stored in the memory and executable by the processor to cause the apparatus to perform the method of one or more of Aspects 12-18.

Aspect 38: An apparatus for wireless communication at a device, comprising a processor; memory coupled with the processor; and instructions stored in the memory and executable by the processor to cause the apparatus to perform the method of one or more of Aspects 19-29.

Aspect 39: An apparatus for wireless communication at a device, comprising a processor; memory coupled with the processor; and instructions stored in the memory and executable by the processor to cause the apparatus to perform the method of one or more of Aspects 30-34.

Aspect 40: A device for wireless communication, comprising a memory and one or more processors coupled to the memory, the one or more processors configured to perform the method of one or more of Aspects 1-6.

Aspect 41: A device for wireless communication, comprising a memory and one or more processors coupled to the memory, the one or more processors configured to perform the method of one or more of Aspects 7-11.

Aspect 42: A device for wireless communication, comprising a memory and one or more processors coupled to the memory, the one or more processors configured to perform the method of one or more of Aspects 12-18.

Aspect 43: A device for wireless communication, comprising a memory and one or more processors coupled to the memory, the one or more processors configured to perform the method of one or more of Aspects 19-29.

Aspect 44: A device for wireless communication, comprising a memory and one or more processors coupled to the memory, the one or more processors configured to perform the method of one or more of Aspects 30-34.

Aspect 45: An apparatus for wireless communication, comprising at least one means for performing the method of one or more of Aspects 1-6.

Aspect 46: An apparatus for wireless communication, comprising at least one means for performing the method of one or more of Aspects 7-11.

Aspect 47: An apparatus for wireless communication, comprising at least one means for performing the method of one or more of Aspects 12-18.

Aspect 48: An apparatus for wireless communication, comprising at least one means for performing the method of one or more of Aspects 19-29.

Aspect 49: An apparatus for wireless communication, comprising at least one means for performing the method of one or more of Aspects 30-34.

Aspect 50: A non-transitory computer-readable medium storing code for wireless communication, the code comprising instructions executable by a processor to perform the method of one or more of Aspects 1-6.

Aspect 51: A non-transitory computer-readable medium storing code for wireless communication, the code comprising instructions executable by a processor to perform the method of one or more of Aspects 7-11.

Aspect 52: A non-transitory computer-readable medium storing code for wireless communication, the code comprising instructions executable by a processor to perform the method of one or more of Aspects 12-18.

Aspect 53: A non-transitory computer-readable medium storing code for wireless communication, the code comprising instructions executable by a processor to perform the method of one or more of Aspects 19-29.

Aspect 54: A non-transitory computer-readable medium storing code for wireless communication, the code comprising instructions executable by a processor to perform the method of one or more of Aspects 30-34.

Aspect 55: A non-transitory computer-readable medium storing a set of instructions for wireless communication, the set of instructions comprising one or more instructions that, when executed by one or more processors of a device, cause the device to perform the method of one or more of Aspects 1-6.

Aspect 56: A non-transitory computer-readable medium storing a set of instructions for wireless communication, the set of instructions comprising one or more instructions that, when executed by one or more processors of a device, cause the device to perform the method of one or more of Aspects 7-11.

Aspect 57: A non-transitory computer-readable medium storing a set of instructions for wireless communication, the set of instructions comprising one or more instructions that, when executed by one or more processors of a device, cause the device to perform the method of one or more of Aspects 12-18.

Aspect 58: A non-transitory computer-readable medium storing a set of instructions for wireless communication, the set of instructions comprising one or more instructions that, when executed by one or more processors of a device, cause the device to perform the method of one or more of Aspects 19-29.

Aspect 59: A non-transitory computer-readable medium storing a set of instructions for wireless communication, the set of instructions comprising one or more instructions that, when executed by one or more processors of a device, cause the device to perform the method of one or more of Aspects 30-34.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An integrated access and backhaul (IAB) node for wireless communication, comprising:
a memory; and
one or more processors, coupled to the memory, configured to:
receive, from a first wireless device, an uplink communication using a first guard interval;
receive, from a second wireless device, a downlink communication using a second guard interval,
a second length of the second guard interval being different from a first length of the first guard interval in accordance with a propagation delay associated with a communication with an IAB donor; and
process the uplink communication and the downlink communication in a same fast Fourier transform window.

2. The IAB node of claim 1, wherein the first wireless device is a user equipment, and the second wireless device is a parent IAB node.

3. The IAB node of claim 1, wherein the second length of the second guard interval is greater than the first length of the first guard interval.

4. The IAB node of claim 1, wherein the one or more processors are further configured to:
receive, from the IAB donor, configuration information indicating the second length of the second guard interval.

5. The IAB node of claim 1, wherein the one or more processors are further configured to:
transmit, to the IAB donor, a request indicating the second length of the second guard interval.

6. The IAB node of claim 5, wherein the one or more processors are further configured to:
determine the propagation delay associated with the communication with the IAB donor; and
determine the second length of the second guard interval based at least in part on the propagation delay.

7. An integrated access and backhaul (IAB) donor for wireless communication, comprising:
a memory; and
one or more processors, coupled to the memory, configured to:
receive, from an IAB node, data indicating a first length of a first guard interval for downlink communications with the IAB node;
transmit, to the IAB node, first configuration information indicating the first length of the first guard interval,
the first length of the first guard interval being different from a second length of a second guard interval associated with uplink communications associated with the IAB node, the first length and the second length being different in accordance with a propagation delay associated with the IAB node; and
transmit, to the IAB node and using the first length of the first guard interval, a downlink communication.

8. The IAB donor of claim 7, wherein the first length of the first guard interval is greater than the second length of the second guard interval.

9. The IAB donor of claim 7, wherein the data indicating the first length of the first guard interval comprises a report from the IAB node that identifies a requested guard interval length.

10. The IAB donor of claim 7, wherein the propagation delay associated with the IAB node comprises a first propagation delay associated with the downlink communications with the IAB node, and wherein the one or more processors are further configured to:
determine the first propagation delay;
determine a second propagation delay associated with uplink communications from the IAB node; and
determine the first length of the first guard interval based at least in part on the first propagation delay and the second propagation delay.

11. The IAB donor of claim 10, wherein the first propagation delay and the second propagation delay are determined during a random access procedure.

12. An integrated access and backhaul (IAB) parent node for wireless communication, comprising:
a memory; and
one or more processors, coupled to the memory, configured to:
receive, from a first IAB node, a first uplink communication using a first guard interval;
receive, from a second IAB node, a second uplink communication using a second guard interval,
a second length of the second guard interval being different from a first length of the first guard interval in accordance with: a first propagation delay associated with the first IAB node, or a second propagation delay associated with the second IAB node; and
process the first uplink communication and the second uplink communication in a same fast Fourier transform window.

13. The IAB parent node of claim 12, wherein the one or more processors are further configured to:
receive, from the first IAB node, data indicating the first length of the first guard interval for first uplink communications to the IAB parent node from the first IAB node; and
receive, from the second IAB node, data indicating the second length of the second guard interval for second uplink communications to the IAB parent node from the second IAB node.

14. The IAB parent node of claim 12, wherein the one or more processors are further configured to:
transmit, to the first IAB node, first configuration information indicating the first length of the first guard interval for first uplink communications to the IAB parent node from the first IAB node; and
transmit, to the second IAB node, second configuration information indicating the second length of the second guard interval for second uplink communications to the IAB parent node from the second IAB node.

15. The IAB parent node of claim 14, wherein the one or more processors are further configured to:
determine the first propagation delay associated with the first IAB node;
determine the second propagation delay associated with the second IAB node;
determine the first length of the first guard interval based at least in part on the first propagation delay; and
determine the second length of the second guard interval based at least in part on the second propagation delay.

16. The IAB parent node of claim 15, wherein the first propagation delay and the second propagation delay are determined during random access procedures with the first IAB node and the second IAB node.

17. The IAB parent node of claim 12, wherein a difference in guard interval lengths is in accordance with at least the first propagation delay, the first propagation delay being associated with a first measure of distance, and wherein the one or more processors are further configured to:
  receive, from the first IAB node, one or more reference signals;
  determine the first measure of distance between the first IAB node and the IAB parent node based at least in part on the one or more reference signals; and
  determine the first length of the first guard interval based at least in part on the first measure of distance.

18. The IAB parent node of claim 17, wherein the one or more processors are further configured to:
  determine that the first length of the first guard interval is greater than the second length of the second guard interval based at least in part on determining that the first measure of distance is greater than a second measure of distance between the second IAB node and the IAB parent node.

19. An integrated access and backhaul (IAB) node for wireless communication, comprising:
  a memory; and
  one or more processors, coupled to the memory, configured to:
    receive, from an IAB parent node and during a fast Fourier transform window, a first downlink communication using a first guard interval; and
    transmit, to a wireless device and during the fast Fourier transform window, a second downlink communication using a second guard interval,
      wherein the first guard interval and second guard interval provide symbol-level alignment for the first downlink communication and the second downlink communication in accordance with a propagation delay associated with the IAB parent node.

20. The IAB node of claim 19, wherein the one or more processors are further configured to:
  receive first configuration information indicating the first guard interval from an IAB donor.

21. The IAB node of claim 20, wherein the one or more processors are further configured to:
  determine the propagation delay associated with the IAB parent node; and
  determine a first length of the first guard interval based at least in part on the propagation delay.

22. The IAB node of claim 21, wherein the one or more processors are further configured to:
  transmit, to the IAB donor, data indicating the first length of the first guard interval.

23. The IAB node of claim 19, wherein the wireless device is an IAB child node, and wherein a first length of the first guard interval matches a second length of the second guard interval.

24. The IAB node of claim 19, wherein the wireless device is a user equipment, and wherein a first length of the first guard interval is less than a second length of the second guard interval.

25. The IAB node of claim 19, wherein the one or more processors are further configured to:
  receive, from an IAB child node and during an other fast Fourier transform window, a first uplink communication using a third guard interval; and
  transmit, to the IAB parent node and during the other fast Fourier transform window, a second uplink communication using a fourth guard interval,
    wherein the third guard interval and fourth guard interval provide symbol-level alignment for the first uplink communication and the second uplink communication.

26. The IAB node of claim 25, wherein the one or more processors are further configured to:
  receive second configuration information indicating the fourth guard interval from an IAB donor.

27. The IAB node of claim 26, wherein the one or more processors are further configured to:
  determine the propagation delay associated with the IAB parent node; and
  determine a fourth length of the fourth guard interval based at least in part on the propagation delay.

28. The IAB node of claim 27, wherein the one or more processors are further configured to:
  transmit, to the IAB donor, data indicating the fourth length of the fourth guard interval.

29. The IAB node of claim 25, wherein the IAB parent node is not an IAB donor, and a third length of the third guard interval matches a fourth length of the fourth guard interval.

30. The IAB node of claim 25, wherein the IAB parent node is an IAB donor, and a third length of the third guard interval is greater than a fourth length of the fourth guard interval.

* * * * *